(12) United States Patent (10) Patent No.: US 12,231,608 B2
Schwarz et al. (45) Date of Patent: Feb. 18, 2025

(54) MULTI-VIEW CODING WITH EFFICIENT RESIDUAL HANDLING

(71) Applicant: Dolby Video Compression, LLC, Wilmington, DE (US)

(72) Inventors: Heiko Schwarz, Panketal (DE); Thomas Wiegand, Berlin (DE); Martin Winken, Berlin (DE)

(73) Assignee: Dolby Video Compression, LLC, Wilmington, DE (US)

( * ) Notice: Subject to any disclaimer, the term of this patent is extended or adjusted under 35 U.S.C. 154(b) by 0 days.

(21) Appl. No.: 17/531,478

(22) Filed: Nov. 19, 2021

(65) Prior Publication Data

US 2022/0159228 A1 May 19, 2022

Related U.S. Application Data

(63) Continuation of application No. 16/848,297, filed on Apr. 14, 2020, now Pat. No. 11,184,600, which is a (Continued)

(51) Int. Cl.
*H04N 13/128* (2018.01)
*H04N 13/161* (2018.01)
(Continued)

(52) U.S. Cl.
CPC ......... *H04N 13/128* (2018.05); *H04N 13/161* (2018.05); *H04N 19/463* (2014.11); *H04N 19/597* (2014.11); *H04N 2213/003* (2013.01)

(58) Field of Classification Search
None
See application file for complete search history.

(56) References Cited

U.S. PATENT DOCUMENTS 7,876,833 B2   1/2011   Segall
7,885,471 B2   2/2011   Segall
(Continued)

FOREIGN PATENT DOCUMENTS

CN   101170702 A   4/2008
CN   101491096 A   7/2009
(Continued)

OTHER PUBLICATIONS

Notice of Allowance issued in corresponding Brazilian Patent Application 11 2014 011425-0 dated Jun. 14, 2022.
(Continued)

*Primary Examiner* — Peter D Le
(74) *Attorney, Agent, or Firm* — Morgan, Lewis & Bockius LLP

(57) ABSTRACT

A gain in multi-view coding is achieved as follows: the residual signal involved with coding a dependent view of the multi-view signal is predicted from a reference residual signal of the current picture of the reference view using block-granular disparity-compensated prediction, i.e. using disparity compensated prediction with a disparity defined at, and varying with, block granularity so that each block of the current picture of the dependent view has its own disparity displacement such as its own disparity vector, associated therewith. In other words, a remaining similarity between the residual signal involved with predictively coding the reference view is used in order to predict the residual signal involved with predictively coding the dependent view.

11 Claims, 16 Drawing Sheets

Related U.S. Application Data continuation of application No. 14/277,850, filed on May 15, 2014, now Pat. No. 10,659,754, which is a continuation of application No. PCT/EP2012/072889, filed on Nov. 16, 2012.

(60) Provisional application No. 61/561,452, filed on Nov. 18, 2011.

(51) Int. Cl.
  H04N 19/463 (2014.01)
  H04N 19/597 (2014.01)

(56) References Cited

U.S. PATENT DOCUMENTS

| | | | |
|---|---|---|---|
| 8,204,129 | B2 | 6/2012 | He |
| 8,369,406 | B2 | 2/2013 | Kim |
| 8,594,193 | B2* | 11/2013 | He ................. H04N 19/597 |
| | | | 348/412.1 |
| 10,887,575 | B2 | 1/2021 | Schwarz et al. |
| 11,523,098 | B2 | 12/2022 | Schwarz et al. |
| 2003/0138150 | A1 | 7/2003 | Srinivasan |
| 2005/0157797 | A1 | 7/2005 | Gaedke |
| 2007/0019726 | A1 | 1/2007 | Cha |
| 2007/0147502 | A1* | 6/2007 | Nakamura ........... H04N 19/597 |
| | | | 375/240.26 |
| 2007/0223582 | A1 | 9/2007 | Borer |
| 2007/0230567 | A1 | 10/2007 | Wang |
| 2008/0069247 | A1 | 3/2008 | He |
| 2008/0089417 | A1 | 4/2008 | Bao |
| 2008/0165848 | A1 | 7/2008 | Ye |
| 2008/0170618 | A1 | 7/2008 | Choi |
| 2008/0198924 | A1* | 8/2008 | Ho ................. H04N 19/57 |
| | | | 375/E7.026 |
| 2008/0205508 | A1 | 8/2008 | Ziauddin |
| 2008/0211901 | A1 | 9/2008 | Civanlar |
| 2008/0267291 | A1 | 10/2008 | Vieron |
| 2009/0010323 | A1* | 1/2009 | Su ................. H04N 19/58 |
| | | | 375/E7.199 |
| 2009/0015662 | A1 | 1/2009 | Kim |
| 2009/0074061 | A1 | 3/2009 | Yin |
| 2009/0096643 | A1 | 4/2009 | Chang |
| 2009/0103616 | A1 | 4/2009 | Ho |
| 2009/0175349 | A1 | 7/2009 | Ye |
| 2009/0190662 | A1* | 7/2009 | Park ................. H04N 19/51 |
| | | | 375/E7.123 |
| 2009/0257492 | A1 | 10/2009 | Andersson et al. |
| 2009/0290643 | A1 | 11/2009 | Yang |
| 2010/0034260 | A1 | 2/2010 | Shimizu et al. |
| 2010/0111183 | A1 | 5/2010 | Jeon et al. |
| 2010/0158129 | A1 | 6/2010 | Lai et al. |
| 2010/0189177 | A1* | 7/2010 | Shimizu ............... H04N 19/176 |
| | | | 375/E7.076 |
| 2010/0220791 | A1* | 9/2010 | Lin ................. H04N 19/597 |
| | | | 375/E7.026 |
| 2010/0220795 | A1 | 9/2010 | Yin |
| 2010/0260260 | A1 | 10/2010 | Wiegand |
| 2010/0260268 | A1 | 10/2010 | Cowan |
| 2010/0284466 | A1 | 11/2010 | Pandit |
| 2010/0309292 | A1 | 12/2010 | Ho et al. |
| 2010/0316139 | A1 | 12/2010 | Le Leannec |
| 2010/0329342 | A1 | 12/2010 | Joshi |
| 2011/0038418 | A1 | 2/2011 | Pandit |
| 2011/0044550 | A1 | 2/2011 | Tian |
| 2011/0090959 | A1 | 4/2011 | Wiegand |
| 2011/0142138 | A1 | 6/2011 | Tian |
| 2011/0222602 | A1 | 9/2011 | Sung et al. |
| 2011/0286520 | A1 | 11/2011 | Xu |
| 2011/0317930 | A1 | 12/2011 | Kim |
| 2012/0023250 | A1 | 1/2012 | Chen |
| 2012/0075436 | A1 | 3/2012 | Chen |
| 2012/0082222 | A1 | 4/2012 | Wang |
| 2012/0114036 | A1 | 5/2012 | Po |
| 2012/0229602 | A1* | 9/2012 | Chen ................. H04N 19/597 |
| | | | 348/43 |
| 2012/0236115 | A1 | 9/2012 | Zhang |
| 2012/0269270 | A1 | 10/2012 | Chen |
| 2013/0229485 | A1 | 9/2013 | Rusanovsky |
| 2013/0293676 | A1 | 11/2013 | Sugio et al. |
| 2013/0322536 | A1 | 12/2013 | Yang |
| 2013/0335522 | A1* | 12/2013 | Zhang ................. H04N 19/597 |
| | | | 348/43 |
| 2020/0036956 | A1 | 1/2020 | Schwarz et al. |

FOREIGN PATENT DOCUMENTS

| | | |
|---|---|---|
| CN | 101600108 A | 12/2009 |
| CN | 101669367 A | 3/2010 |
| CN | 101690220 A | 3/2010 |
| CN | 101867813 A | 10/2010 |
| CN | 101911700 A | 12/2010 |
| CN | 101917619 A | 12/2010 |
| CN | 101986716 A | 3/2011 |
| CN | 102077246 A | 5/2011 |
| EP | 2 348 733 A2 | 7/2011 |
| IN | 101248669 A | 8/2008 |
| JP | 2008-22549 A | 1/2008 |
| JP | 2009-213161 A | 9/2009 |
| JP | 2009-543508 A | 12/2009 |
| JP | 2010-525724 A | 7/2010 |
| JP | 2010-53748 A | 12/2010 |
| JP | 2011-509631 A | 3/2011 |
| KR | 10-2009-0046826 A | 5/2009 |
| KR | 10-2029401 B1 | 11/2019 |
| KR | 10-2090106 B1 | 3/2020 |
| WO | 2007/037645 A1 | 4/2007 |
| WO | 2007/081756 A2 | 7/2007 |
| WO | 2008/007913 A1 | 1/2008 |
| WO | 2009/005626 A2 | 1/2009 |
| WO | 2010/043773 A1 | 4/2010 |
| WO | 2013/072484 A1 | 5/2013 |

OTHER PUBLICATIONS

Notice of Allowance issued in corresponding U.S. Appl. No. 17/129,450 dated Jul. 25, 2022.
Office Action issued in corresponding Korean Patent Application No. 10-2021-7034174 dated Feb. 9, 2022, with English translation.
Communication pursuant to Article 94(3) EPC issued in corresponding European Patent Application No. 19 195 147.4 dated Apr. 1, 2022.
Office Action issued in corresponding Japanese Patent Application 2021-100230 dated Jul. 8, 2022, with English translation.
Office Action (Notice of Allowance) issued in corresponding Korean Patent Application No. 10-2021-7034174 dated Oct. 24, 2022, with English translation.
Appeal Decision issued in corresponding Japanese Patent Application No. 2019-105062 dated Dec. 13, 2022, with English translation.
Notice of Allowance Korean Patent Application No. 10-2018-7024889 dated Jul. 1, 2019.
Office Action issued Sep. 17, 2019 in Japanese Patent Application 2017-137033.
Office Action issued Dec. 11, 2019 in Korean Application 10-2019-7028653.
Notice of Allowance mailed Jan. 14, 2020 in U.S. Appl. No. 14/277,850.
Office Action issued Jan. 7, 2020 in Japanese Application 2017-137033.
Notice of Allowance mailed Feb. 11, 2020 in U.S. Appl. No. 14/273,730.
Notice of Allowance issued in U.S. Appl. No. 16/848,297 dated Jul. 22, 2021.
Office Action issued in U.S. Appl. No. 16/848,297 dated Apr. 7, 2021.
Final Office Action issued in U.S. Appl. No. 14/277,850 dated Dec. 10, 2018.
Final Office Action issued in U.S. Appl. No. 14/277,850 dated Oct. 3, 2017.

(56) References Cited

OTHER PUBLICATIONS

Office Action issued in U.S. Appl. No. 14/277,850 dated May 30, 2019.
Office Action issued in U.S. Appl. No. 14/277,850 dated May 10, 2018.
Office Action issued in U.S. Appl. No. 14/277,850 dated Dec. 27, 2016.
Notice of Allowance issued in corresponding U.S. Appl. No. 16/871,919 dated Sep. 20, 2021.
Office Action issued in corresponding U.S. Appl. No. 16/871,919 dated Jun. 10, 2021.
Notice of Allowance issued in corresponding U.S. Appl. No. 16/592,433 dated Sep. 3, 2020.
Office Action issued in corresponding European Patent Application No. 19 195 133.4-1207 dated May 2, 2022.
Office Action (Notification of Reasons for Refusal) issued in corresponding Japanese Patent Application No. 2019-105062 dated Apr. 11, 2022, with English translation.
Office Action issued in corresponding Chinese Patent Application 201910417853.8 dated Sep. 6, 2022.
Non-Final Office Action issued in corresponding U.S. Appl. No. 17/129,450 dated Mar. 3, 2022.
Office Action issued in corresponding Korean Patent Application No. 10-2020-7007160 dated Jul. 21, 2021.
Notice for Decision to Reject issued in corresponding Korean Patent Application No. 10-2020-7007160 dated Apr. 19, 2021.
Office Action issued in corresponding Japanese Patent Application No. 2019-105062 dated Feb. 16, 2021 (drafted Feb. 4, 2021), with English translation.
Office Action issued in corresponding Indian Patent Application No. 201938021966 dated Feb. 25, 2021.
Office Action issued in corresponding U.S. Appl. No. 16/871,866 dated Oct. 9, 2020.
Office Action issued Jul. 14, 2020 in Japanese Application 2019-105062.
Haitao Yang et al., Regional Disparity Based Motion and Disparity Prediction for MVC, Joint Video Team (JVT) of SO/IEC MPEG & ITU-T VCEG{ISO/IEC JTC1/SC29/WG11 and ITU-T SG16 Q.6), 22nd Meeting: Marrakech, Morocco, Jan. 2007, JVT-V071r1, pp. 1-6.
Office Action issued Sep. 30, 2020 in European Application 20168600.3.
Notice of Allowance mailed Sep. 3, 2020 in U.S. Appl. No. 16/859,243.
Office Action issued Apr. 23, 2020 in European Application 19195147.4.
Office Action issued Apr. 23, 2020 in European Application 19195133.4.
Office Action issued Jun. 1, 2020 in Korean Application 10-2020-7007160.
Bartnik et al., "HEVC Extension for Multiview Video Coding and Multiview Video plus Depth Coding"; ITU-Telecommunications Standardization Sector Study Group 16 Question 6, Document VCEG-AR13, Feb. 3-10, 2012, 42 pages.
Ekmekcioglu et al., "Content Adaptive Enhancement of Multi-View Depth Maps for Free Viewpoint Video", IEEE Journal of Selected Topics in Signal Processing, vol. 5, No. 2, Aprill, 2011, pp. 352-361.
ITU-T and ISO/IEC JTC 1, "Advanced Video Coding for Generic Audiovisual Services", Recommendation ITU-T H.264 and ISO/IEC 14496-10 (MPEG-4 Avc), 2010.
Merkle et al., "3D Video Coding: An Overview of Present and Upcoming Standards", Visual Communications and Image Processing, Jul. 11, 2010, 7 pages, Huang Shan, An Hui, China.
Na, S. et al., "Multi-View Depth Video Coding using Depth View Synthesis", IEEE International Symposium on Circuits and Systems, May 18, 2008, pp. 1400-1403.
Office Action dated Feb. 25, 2016 in parallel European Patent Application No. 12784624.4, 4 pages.
Office Action mailed Sep. 30, 2016 in U.S. Appl. No. 14/273,730.

Official Communication issued in corresponding International Application PCT /EP2012/072889, mailed on Mar. 19, 2013.
Official Communication issued in corresponding Korean Patent Application No. 10-2014-7015900 mailed on Jul. 29, 2016.
Official Communication issued in International Patent Application No. PCT /EP2012/072299, mailed on May 21, 2013.
Schwarz et al., "Description of 30 Video Coding Technology Proposal by Fraunhofer HHI (HEVC compatible, configuration A)", ISO/IEC JTC1/SC29/WG11, MPEG2011/M22570, Nov. 2011, 46 pages, Geneva, Switzerland.
Schwarz, H. et al., "Overview of the Scalable Video Coding Extension of the H.264/AVC Standard", IEEE Transactions on Circuits and Systems for Video Technology, vol. 17, No. 9, pp. 1103-1120, Sep. 2007.
Seo et al., "Motion Information Sharing Mode for Depth Video Coding", IEEE, 3DTV-Conference: the True Vision-Capture, Transmission and Display of 30 Video, Jun. 7, 2010, pp. 1-4.
Shimizu, S. et al., "View Scalable Multiview Video Coding Using 3-D Warping With Depth Map", IEEE Transactions on Circuits and Systems for Video Technology, vol. 17, No. 11, Nov. 2007, pp. 1485-1495.
Stefanoski, N. et al., "Description of 30 Video Coding Technology Proposal by Disney Research Zurich and Fraunhofer HHI", Motion Picture Expert Group meeting, No. M22668, Nov. 22, 2011, 34 pages.
Tanimoto et al., "Multi-view Depth Map of Rena and Akko & Kayo", ISO/IEC JTC1/SC29/WG11 M14888, Oct. 2007, 5 pages, Shenzhen, China.
Tanimoto et al., "View Synthesis Algorithm in View Synthesis Reference Software 2.0 (VSRS2.0)", ISO/IEC JTCI/SC29/WG11, MPEG 2008/M16090, Feb. 2009,5 pages, Lausanne, Switzerland.
Vetro et al., "Overview of the Stereo and Multiview Video Coding Extensions of the H.264/MPEG-4 AVC Standard", Proceedings of the IEEE, vol. 99, No. 4, Apr. 11, 2011, pp. 626-642.
Vetro et al., "Joint Multiview Video Model (JMVM) 6.0", Joint Video Team (JVT) of ISO/IEC MPEG & ITU-T VCEG (ISO/IEC JTC1/SC29/WG11 and ITU-T SG16 0.6, 25th Meeting, Document JVT-Y207, Oct. 2007, 10 pages, Shenzhen, China.
Zheng et al., "Affine Model for Disparity Estimation in Multiview Sequence Coding", International Conference on Information Theory and Information Security (ICITIS), Dec. 17, 2010, pp. 736-740, Nanning, China.
Office Action mailed Dec. 27, 2016 in U.S. Appl. No. 14/277,850.
Office Action issued Feb. 17, 2017 in Chinese Application No. 2012800667391.
Office Action issued Mar. 15, 2017 in U.S. Appl. No. 14/272,671.
Office Action issued Oct. 20, 2017 in U.S. Appl. No. 14/273,730.
Office Action issued Oct. 3, 2017 in U.S. Appl. No. 14/277,850.
Office Action issued Nov. 23, 2017 in European Application 12784624.4.
Non-final Office Action U.S. Appl. No. 14/277,850 dated May 10, 2018.
Konieczny et al., "Depth-Based Inter-view Prediction of Motion Vectors for Improved Multiview Video Coding", 2010, IEEE. pp. 1-4.
Notice of Allowance U.S. Appl. No. 14/272,671 dated Jun. 4, 2018.
Non-final Office Action U.S. Appl. No. 14/273,730 dated Jun. 1, 2018.
Final Office Action U.S. Appl. No. 14/277,850 dated Dec. 10, 2018.
Summons to Attend Oral Hearing EP Application No. 1284624.4 dated Jan. 2, 2019.
Final office action U.S. Appl. No. 14/273,730 dated Jan. 28, 2019.
Non-final Office Action U.S. Appl. No. 16/120,731 dated Mar. 21, 2019.
Non-final Office Action U.S. Appl. No. 14/277,850 dated May 30, 2019.
Notice of Allowance U.S. Appl. No. 16/120,731 dated Jul. 3, 2019.
Non-final Office Action U.S. Appl. No. 14/273,730 dated Jun. 14, 2019.
Decision to Grant issued in corresponding Japanese Patent Application 2021-100230 dated Feb. 14, 2023, with English translation.

(56) References Cited

OTHER PUBLICATIONS

Communication pursuant to Article 94(3) EPC issued in corresponding European Application No. 20 168 600.3-1208 dated Feb. 13, 2023.
Notice of Issuance issued in corresponding Chinese Patent Application No. 201910417853.8 dated Apr. 15, 2023.
Office Action issued in corresponding U.S. Appl. No. 17/576,873 dated Mar. 6, 2023.

* cited by examiner

MULTI-VIEW CODING WITH EFFICIENT RESIDUAL HANDLING

CROSS REFERENCE TO RELATED APPLICATIONS

The present application is a Continuation Application of U.S. patent application Ser. No. 16/848,297, filed Apr. 14, 2020, which is a continuation of U.S. patent application Ser. No. 14/277,850 filed May 15, 2014 (now U.S. Pat. No. 10,659,754, issued May 19, 2020), which is a continuation of International Patent Application PCT/EP2012/072889, filed Nov. 16, 2012, which claims priority from U.S. Patent Application 61/561,452, filed Nov. 18, 2011, all of which are incorporated herein by reference in their entireties.

BACKGROUND OF THE INVENTION

The present invention is concerned with multi-view coding.

In multi-view video coding, two or more views of a video scene (which are simultaneously captured by multiple cameras) are coded in a single bitstream. The primary goal of multi-view video coding is to provide the end user with an advanced multimedia experience by offering a 3-d viewing impression. If two views are coded, the two reconstructed video sequences can be displayed on a conventional stereo display (with glasses). However, the necessitated usage of glasses for conventional stereo displays is often annoying for the user. Enabling a high-quality stereo viewing impression without glasses is currently an important topic in research and development. A promising technique for such autostereoscopic displays is based on lenticular lens systems. In principle, an array of cylindrical lenses is mounted on a conventional display in a way that multiple views of a video scene are displayed at the same time. Each view is displayed in a small cone, so that each eye of the user sees a different image; this effect creates the stereo impression without special glasses. However, such autosteroscopic displays necessitate typically 10-30 views of the same video scene (even more views may be necessitated if the technology is improved further). More than 2 views can also be used for providing the user with the possibility to interactively select the viewpoint for a video scene. But the coding of multiple views of a video scene drastically increases the necessitated bit rate in comparison to conventional single-view (2-d) video. Typically, the necessitated bit rate increases approximately linearly with the number of coded views. A concept for reducing the amount of transmitted data for autostereoscopic displays consists of transmitting only a small number of views (perhaps 2-5 views), but additionally transmitting so-called depth maps, which represent the depth (distance of the real world object to the camera) of the image samples for one or more views. Given a small number of coded views with corresponding depth maps, high-quality intermediate views (virtual views that lie between the coded views)—and to some extend also additional views to one or both ends of the camera array—can be created at the receiver side by a suitable rendering techniques.

For both stereo video coding and general multi-view video coding (with or without depth maps), it is important to exploit the interdependencies between the different views. Since all views represent the same video scene (from a slightly different perspective), there is a large amount of interdependencies between the multiple views. The goal for designing a highly efficient multi-view video coding system is to efficiently exploit these interdependencies. In conventional approaches for multi-view video coding, as for example in the multi-view video coding (MVC) extension of ITU-T Rec. H.264 I ISO/IEC 14496-10, the only technique that exploits view interdependencies is a disparity-compensated prediction of image samples from already coded views, which is conceptually similar to the motion-compensated prediction that is used in conventional 2-d video coding. However, typically only a small subset of image samples is predicted from already coded views, since the temporal motion-compensated prediction is often more effective (the similarity between two temporally successive images is larger than the similarity between neighboring views at the same time instant). In order to further improve the effectiveness of multi-view video coding, it is necessitated to combine the efficient motion-compensated prediction with inter-view prediction techniques. One possibility is to re-use the motion data that are coded in one view for predicting the motion data of other views. Since all views represent the same video scene, the motion in one view is connected to the motion in other views based on the geometry of the real-world scene, which can be represented by depth maps and some camera parameters.

In state-of-the-art image and video coding, the pictures or particular sets of sample arrays for the pictures are usually decomposed into blocks, which are associated with particular coding parameters. The pictures usually consist of multiple sample arrays (luminance and chrominance). In addition, a picture may also be associated with additional auxiliary samples arrays, which may, for example, specify transparency information or depth maps. Each picture or sample array is usually decomposed into blocks. The blocks (or the corresponding blocks of sample arrays) are predicted by either inter-picture prediction or intra-picture prediction. The blocks can have different sizes and can be either quadratic or rectangular. The partitioning of a picture into blocks can be either fixed by the syntax, or it can be (at least partly) signaled inside the bitstream. Often syntax elements are transmitted that signal the subdivision for blocks of predefined sizes. Such syntax elements may specify whether and how a block is subdivided into smaller blocks and being associated coding parameters, e.g. for the purpose of prediction. For all samples of a block (or the corresponding blocks of sample arrays) the decoding of the associated coding parameters is specified in a certain way. In the example, all samples in a block are predicted using the same set of prediction parameters, such as reference indices (identifying a reference picture in the set of already coded pictures), motion parameters (specifying a measure for the movement of a blocks between a reference picture and the current picture), parameters for specifying the interpolation filter, intra prediction modes, etc. The motion parameters can be represented by displacement vectors with a horizontal and vertical component or by higher order motion parameters such as affine motion parameters consisting of six components. It is also possible that more than one set of particular prediction parameters (such as reference indices and motion parameters) are associated with a single block. In that case, for each set of these particular prediction parameters, a single intermediate prediction signal for the block (or the corresponding blocks of sample arrays) is generated, and the final prediction signal is built by a combination including superimposing the intermediate prediction signals. The corresponding weighting parameters and potentially also a constant offset (which is added to the weighted sum) can either be fixed for a picture, or a reference picture, or a set of reference pictures, or they can be included in the set of prediction parameters for the corresponding block. The difference between the original blocks (or the corresponding blocks of sample arrays) and their prediction signals, also referred to as the residual signal, is usually transformed and quantized. Often, a two-dimensional transform is applied to the residual signal (or the corresponding sample arrays for the residual block). For transform coding, the blocks (or the corresponding blocks of sample arrays), for which a particular set of prediction parameters has been used, can be further split before applying the transform. The transform blocks can be equal to or smaller than the blocks that are used for prediction. It is also possible that a transform block includes more than one of the blocks that are used for prediction. Different transform blocks can have different sizes and the transform blocks can represent quadratic or rectangular blocks. After transform, the resulting transform coefficients are quantized and so-called transform coefficient levels are obtained. The transform coefficient levels as well as the prediction parameters and, if present, the subdivision information is entropy coded.

The state-of-the-art in multi-view video coding extends the 2-d video coding techniques in a straightforward way. Conceptually, two or more video sequences, which correspond to the different views, are coded (or decoded) in parallel. Or more specifically, for each access unit (or time instant), the pictures corresponding to the different views are coded in a given view order. An MVC bitstream contains a base view, which can be decoded without any reference to other views. This ensures backwards compatibility with the underlying 2-d video coding standard/scheme. The bitstream is usually constructed in a way that the sub-bitstream corresponding to the base view (and in addition sub-bitstreams corresponding to particular subsets of the coded views) can be extracted in a simple way by discarding some packets of the entire bitstream. In order to exploit dependencies between views, pictures of already coded views of the current access unit can be used for the prediction of blocks of the current view. This prediction is often referred to as disparity-compensated prediction or inter-view prediction. It is basically identical to the motion-compensated prediction in conventional 2-d video coding; the only difference is that the reference picture represents a picture of a different view inside the current access unit (i.e., at the same time instant) and not a picture of the same view at a different time instant. For incorporating inter-view prediction in the design of the underlying 2-d video coding scheme, for each picture, one or more reference picture lists are constructed. For the base view (independently decodable view), only conventional temporal reference pictures are inserted into the reference picture lists. However, for all other views, inter-view reference pictures can be inserted into a reference picture list in addition (or instead of) temporal reference pictures. Which pictures are inserted into a reference picture list determined by the video coding standard/scheme and/or signaled inside the bitstream (e.g., in a parameter set and/or slice header). Whether a temporal or inter-view reference picture is chosen for a particular block of the current view is then signaled by coding (or inferring) a reference picture index. i.e., the inter-view reference pictures are used in exactly the same way as conventional temporal reference pictures; only the construction of the reference picture lists of slightly extended.

The current state-of-the-art in multi-view video coding is the Multi-view Video Coding (MVC) extension of ITU-T Rec. H.264 1 ISO/IEC JTC 1 [1][2]. MVC is a straightforward extension of ITU-T Rec. H.264 I ISO/IEC JTC 1 towards multi-view video coding. Beside some extensions of the high level syntax, the only tool that has been added is the disparity-compensated prediction as described above. However, it should be noted that disparity-compensated prediction is typically only used for a small percentage of block. Except for regions that are covered or uncovered due to the motion inside a scene, the temporal motion-compensated prediction typically provides a better prediction signal than the disparity-compensated prediction, in particular if the temporal distance between the current and the reference picture is small. The overall coding efficiency could be improved if the temporal motion-compensated prediction could be combined with suitable inter-view prediction techniques. There is a conceptually similar problem in scalable video coding, where two representations of the same video sequence with different resolutions or fidelities are coded in a single bitstream. For the enhancement layer, there are in principle two possibilities to prediction a block of samples (if we ignore spatial intra prediction), using a temporal motion-compensated prediction from an already coded enhancement layer picture or an inter-layer prediction from the lower layer. In Scalable Video Coding (SVC) extension [3], the conventional temporal motion-compensated prediction has been combined with an inter-layer prediction of motion parameters. For an enhancement layer block, it provides the possibility to re-use the motion data of the co-located base layer block, but apply it to the enhancement layer (i.e., use the enhancement layer reference picture with base layer motion data). In this way, the temporal motion-compensated prediction inside a layer is efficiently combined with an inter-layer prediction of motion data. The general idea behind this technique is that all layers in a scalable bitstream show the same content, and hence also the motion inside each layer is the same. It does not necessarily mean that the best motion parameters for one layer are also the best motion parameters for a following layer due to the following effects: (1) The quantization of the reference pictures modifies the sample values and since different layers are quantized differently, the motion parameters that give the smallest distortion can be different for different layers; (2) Since the layers are coded at different bit rates, a particular set of motion parameters usually corresponds to a different trade-off between rate and distortion. And in rate-distortion optimized coding (which is for example achieved by minimizing of the Lagrangian functional $D+\lambda R$ of the distortion $D$ and the associated rate $R$), different motion parameters can be optimal in rate-distortion sense for different layers (the operating point given by $R$ as well as the associated distortion or rate can be different). Nonetheless, the (optimal) motion parameters in base and enhancement layer are usually similar. And it is typically very likely that a mode the re-uses the motion parameters of the base layer (and is therefore associated with a small rate $R$) leads to a smaller overall cost ($D+\lambda R$) than the optimal mode that is independent of the base layer. Or in other words, it is likely that the distortion increase $\Delta D$ that is associated by choosing the mode with base layer motion data instead of the mode with optimal enhancement motion data is smaller than the cost that is associated with the decrease in rate ($\Delta D < \lambda \alpha R < 0$).

Conceptually, a similar concept as for SVC can also be used in multi-view video coding. The multiple cameras capture the same video scene from different perspective. However, if a real world object moves in the scene, the motion parameters in different captured views are not independent. But in contrast to scalable coding, where the position of an object is the same in all layers (a layer represent just a different resolution or a different quality of the same captured video), the interrelationship of the projected motion is more complicated and depends on several camera parameters as well as on the 3-d relationships in the real-world scene. But if all relevant camera parameters (such as focal length, distance of the cameras, and direction of the optical axis of the cameras) as well as the distance of the projected object points (depth map) are given, the motion inside a particular view can be derived based on the motion of another view. In general, for coding a video sequence or view, we don't need to know the exact motion of the object points; instead simple parameters such as motion vectors for blocks of samples are sufficient. In this spirit, also the relationship of the motion parameters between different views can be simplified to some extent

SUMMARY

According to an embodiment, an apparatus for reconstructing a multi-view signal coded into a multi-view data stream may have: a reference-view reconstructor configured to predictively reconstruct a current picture of a reference view of the multi-view signal; a dependent-view reconstructor configured to reconstruct the current picture of the dependent view of the multi-view signal using block-based predictive coding, wherein the dependent-view reconstructor is configured to, in reconstructing the current picture of the dependent view, predict a residual signal of the current picture of the dependent view from a reference residual signal of the current picture of the reference view using block-granular disparity-compensated prediction.

According to another embodiment, an apparatus for encoding a multi-view signal into a multi-view data stream may have: a reference-view encoder configured to predictively encode a current picture of a reference view of the multi-view signal; a dependent-view encoder configured to encode the current picture of the dependent view of the multi-view signal using block-based predictive coding, wherein the dependent-view encoder is configured to, in encoding the current picture of the dependent view, predict a residual signal of the current picture of the dependent view from a reference residual signal of the current picture of the reference view using block-granular disparity-compensated prediction.

According to another embodiment, a method for reconstructing a multi-view signal coded into a multi-view data stream may have the steps of: predictively reconstructing a current picture of a reference view of the multi-view signal; reconstructing the current picture of the dependent view of the multi-view signal using block-based predictive coding, the reconstructing the current picture of the dependent view includes predicting a residual signal of the current picture of the dependent view from a reference residual signal of the current picture of the reference view using block-granular disparity-compensated prediction.

According to another embodiment, a method for encoding a multi-view signal into a multi-view data stream may have the steps of: predictively encoding a current picture of a reference view of the multi-view signal; encoding the current picture of the dependent view of the multi-view signal using block-based predictive coding, encoding the current picture of the dependent view includes predicting a residual signal of the current picture of the dependent view from a reference residual signal of the current picture of the reference view using block-granular disparity-compensated prediction.

Another embodiment may have a computer program having a program code for performing, when running on a computer, an inventive method.

The basic idea underlying the present invention is that a gain in multi-view coding may be achieved if the residual signal involved with coding a dependent view of the multi-view signal is predicted from a reference residual signal of the current picture of the reference view using block-granular disparity-compensated prediction, i.e. using disparity compensated prediction with a disparity defined at, and varying with, block granularity so that each block of the current picture of the dependent view has its own disparity displacement such as its own disparity vector, associated therewith. In other words, it is an idea of the present invention that a remaining similarity between the residual signal involved with predictively coding the reference view may be used in order to predict the residual signal involved with predictively coding the dependent view, provided that the disparity displacement is estimated at a sufficient spatial resolution and/or at a sufficient estimation accuracy. In this regard, the present invention is also based on the inventors having discovered that disparity information is often available in multi-view data streams for coding the dependent view, such as for blocks of the dependent view coded in an inter-view block coding mode. Predicting the residual signal of the current picture of the dependent view may, however, not only be performed for blocks for which disparity displacement information is already available in form of disparity data for inter-view coded blocks, or in form of explicitly signaled information within the multi-view view data stream. Rather, embodiments of the present invention reveal that there is enough information within a multi-view data stream so as to estimate such disparity displacement at a sufficient accuracy so that this estimate is also available irrespective from the just-mentioned conditions.

BRIEF DESCRIPTION OF THE DRAWINGS

Embodiments of the present invention will be detailed subsequently referring to the appended drawings, in which.

DETAILED DESCRIPTION OF THE INVENTION

Figure 1A:
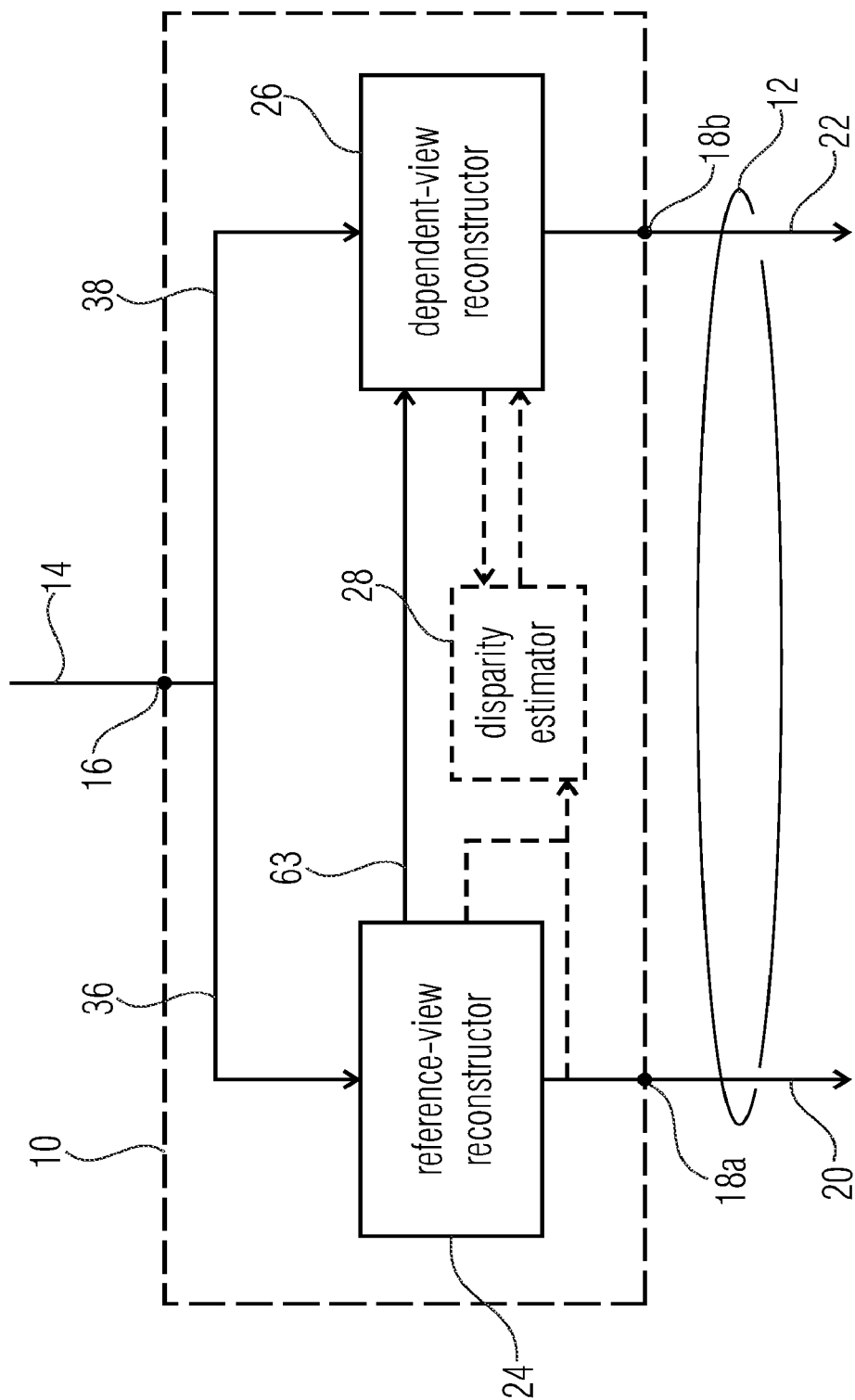
FIG. 1a shows a block diagram of an apparatus for reconstructing a multi-view signal in accordance with an embodiment.

FIG. 1a shows an embodiment for an apparatus 10 for reconstructing a multi-view signal 12 coded into a multi-view data stream 14. The apparatus 10 comprises an input 16 for the multi-view data stream 14, and two outputs 18a and 18b for a reference view signal 20 and a dependent view signal 22, respectively. Further, apparatus 10 comprises a reference-view reconstructor 24 connected between input 16 and output 18a, and a dependent-view reconstructor 26 connected between input 16 and output 18b. Optionally, a depth map estimator 28 of apparatus 10 may be connected between reference-view reconstructor 24 and dependent-view reconstructor 26 with a significance and the way of connection being set out in more detail below.

The apparatus or decoder 10 of FIG. 1 is configured to reconstruct the multi-view signal 12 from the multi-view data stream 14. In doing so, the apparatus may obey a predetermined coding/decoding order according to which the reference signal 20 is processed prior to dependent view 22.

Figure 1B:
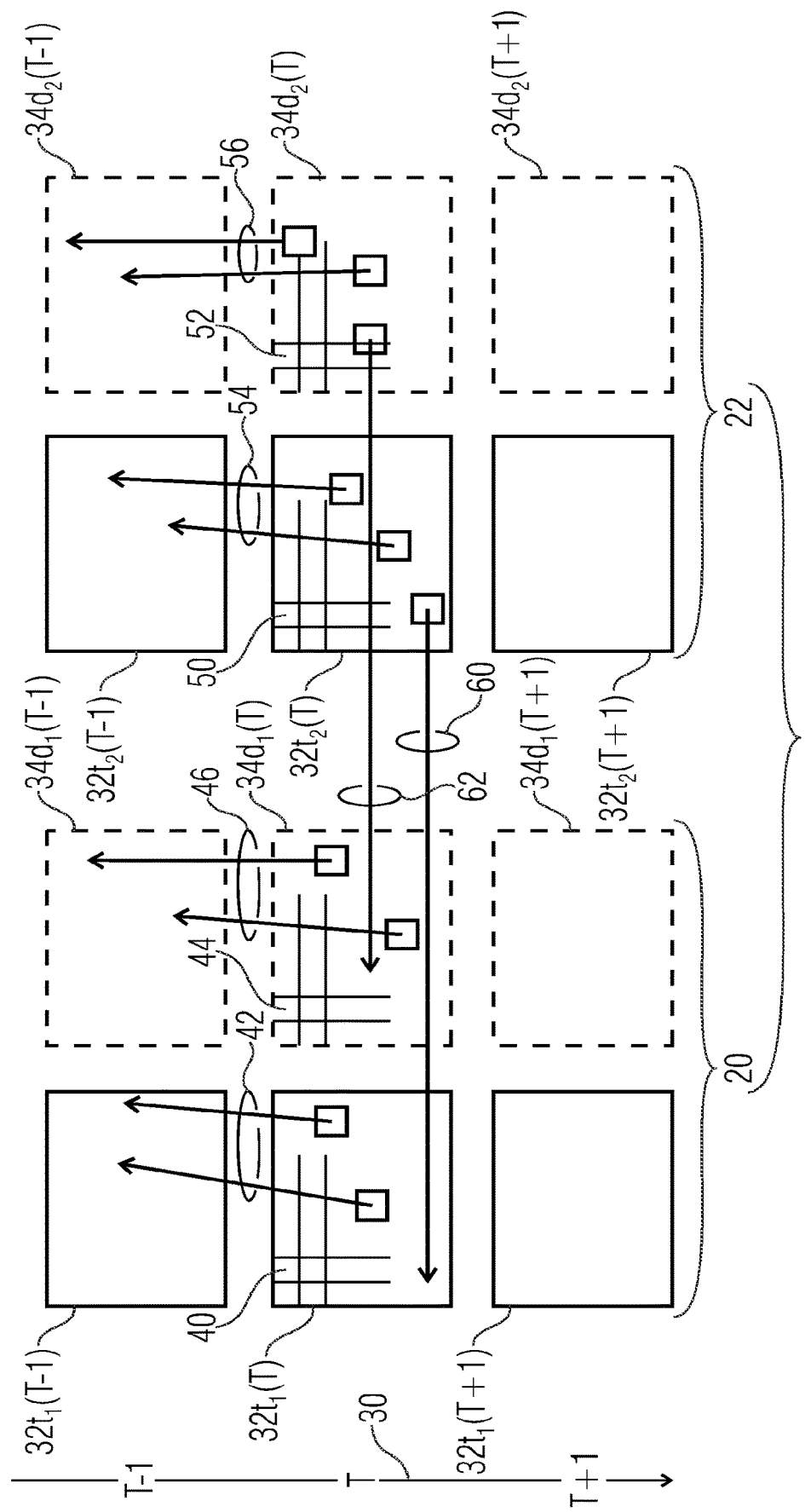
FIG. 1b shows a schematic diagram illustrating components of a multi-view signal in accordance with various embodiments.

FIG. 1b illustrates possible components within multi-view signal 12. As illustrated in FIG. 1b, the multi-view signal 12 may not only represent a spatial sampling of one common scene from different view directions or view points associated with respective views 20 and 22, but also a temporal sampling of this scene as it is illustrated in FIG. 1b exemplarily by showing three consecutive time instants T−1, T and T+1 along a time axis 30. For each time instant, each view 20 and 22 comprises a picture $32t_1$ and $32t_2$, respectively, with a time instant to which these pictures belong, being indicated in FIG. 1b in parenthesis. Each picture $32t_{1,2}$ represents a respective texture map, i.e. a spatial sampling of the color, luminance, intensity or brightness in this scene as seen from the respective view points, respectively.

It is noted that FIG. 1b shows both views 20 and 22 as having their pictures $32ti,2$ temporally aligned. However, this is not necessarily the case. The pictures $32t_1$ and $32t_2$ may be interlaced, or the time resolution between view 20 and view 22 may even differ.

The decoder 10 is configured to process, or reconstruct, the multi-view signal 12 sequentially in time. To be more precise, decoder 10 is configured to reconstruct the pictures $32t_{1,2}$ of the views 20 and 22 of the multi-view signal 12 of a certain time instant, such as T−1, prior to continuing with processing the views 20 and 22 regarding the subsequent time instant T, i.e. prior to reconstructing pictures $32t_{1,2}$ (T). In this regard, it is noted that the temporal coding order among the time instants of the multi-view signal 12 may be equal to the presentation time order of the pictures $32t_{1,2}$ or may differ therefrom.

As also shown in FIG. 1b, the multi-view signal 12 may additionally not only represent a spatial or spatio-temporal sampling of the texture of the common scene from the different view directions or view points associated with the respective views 20 and 22, but also a spatial or spatio-temporal sampling of this scene with regard to depth. For example, as illustrated in FIG. 1b, each picture $32t_{1,2}$ may comprise, or may have associated therewith, a respective depth map $34dt_1$ and $34dt_2$. As known in the art, the additional information sent by these depth maps $34dt_{1,2}$ may be used by an intermediate-view synthesizer downstream to output 18a and 18b, respectively, in order to synthesize intermediate views between views 20 and 22 from the pictures $32t_{1,2}$. Regarding the afore-mentioned coding order, the decoder 10 may be configured to use a decoding order according to which the texture of the reference view is reconstructed prior to the associated depth, with merely then stepping forward to reconstruct the texture, followed by its depth map, of the dependent view of the same time instant, wherein after the same information is reconstructed for the next time instant and so forth.

It is noted that FIG. 1 assumes that each picture $32t_{1,2}$ comprises a respective depth map $34dt_{1,2}$, but this does not need to be the case. The temporal resolution of the depth map $34dt_{1,2}$ may differ from the associated sequence of pictures $32t_{1,2}$. Moreover, even the time resolution between views 20 and 22 may differ. Naturally, the same applies to the spatial resolution of the texture and depth maps. Texture map resolution and depth resolution may differ from each other in time and/or spatial dimensions.

Finally with regard to FIG. 1b, it is noted that the term "picture" is used herein in two meanings, namely first, to denote the conglomeration of all spatially sampled information of a respective view for a certain time instant, such as texture and depth map together, and second, merely the texture at the current time instant. The context will reveal which meaning is respectively meant.

Thus, back to FIG. 1a, the mode of operation of decoder 10 shall be explained. As already noted above, decoder 10 is configured to process the multi-view signal 12, i.e. to reconstruct same, sequentially in time. To be more precise, decoder 10 may be configured to reconstruct the pictures $32t_{1,2}$ and the respective depth maps $34dt_{1,2}$ of a certain time instant, such as T−1, prior to continuing with processing the pictures and depth maps of another time instant T. In particular, the reference-view reconstructor 24 is configured to reconstruct the reference view 20, while dependent-view reconstructor 26 is configured to reconstruct the dependent view 22. Reference-view reconstructor 24 reconstructs the reference view 20 from a reference view portion 36 of the multi-view data stream 14, while dependent-view reconstructor 26 reconstructs the dependent view 22 based on a dependent view portion 38 of the multi-view data stream 14. In fact, reference-view reconstructor 24 and dependent-view reconstructor 26 may be configured to operate in a similar manner. For example, reference reconstructor 24 and dependent-view reconstructor 26 both use predictive coding in order to reconstruct the respective signal 20 and 22, respectively. The dependent-view reconstructor is configured to reconstruct the dependent view 22 of the multi-view signal 12 using block-based predictive coding, and the reference-view reconstructor may likewise use block-based predictive coding in order to reconstruct the reference view 20 of the multi-view signal 12. Both may, for example, be configured as a hybrid video decoder, respectively. The reference-view reconstructor 24 reconstructs, for example, the picture or texture map $32t_1$ of a current time instant T by assigning a respective one of available block coding modes to the blocks 40 into which this picture is subdivided. The subdivision of the picture $32t_1$ into blocks may be predefined by default, or may be signaled within the multi-view data stream 14. The subdivision may subdivide picture $32t_1$ in a regular manner into blocks of the same size or blocks of different size. For example, the sub-division may first sub-divide the picture regularly into rows and columns of tree-root blocks which, in turn, are sub-divided using multi-tree subdivisioning with the information concerning the latter being, for example, signaled for each tree-root block in the data stream 14. In other words, a multi-tree subdivisioning may be possible so that the block size of the blocks 40 may be locally adapted to the picture content.

The coding modes available may comprise one or more intra prediction modes according to which reference-view reconstructor 24 fills the respective block 40 by prediction from already reconstructed samples of already reconstructed blocks preceding the current block in a decoding order defined among the blocks of picture $32t_1$, and/or one or more inter prediction block coding modes according to which reference-view reconstructor 24 reconstructs the respective block by motion compensated prediction using motion data such as motion vectors, reference picture indices and the like. For example, for illustration purposes two blocks are exemplarily shown to be reconstructed by inter prediction. The motion data 42 for these inter-predicted blocks may comprise motion vectors used by reference-view reconstructor 24 to copy respective portions of a reconstructed version of a reference picture $32t_1$ indexed by a reference index also comprised by the motion data 42. The motion data 42 is comprised by the reference view portion 36 of multi-view data stream 14.

Reference-view reconstructor 24 may, however, also be responsible for reconstructing the depth map $34d_1$, if present, of the current picture $32t_1$ of the current time instance T of the reference view 20 from a reference view depth map portion of portion 36. As illustrated in FIG. 1a, reference-view reconstructor 24 may also use a block-wise processing in order to reconstruct the depth map $34d_1$. The subdivision of depth map $34d_1$ may be spatially adopted from the subdivision of the corresponding picture $32t_1$, or subdivision information may be contained in multi-view data stream 14 with regard to depth map $34d_1$. The coding modes which reference-view reconstructor 24 supports for the blocks 44 of depth map $34d_1$ may or may not comprise the coding modes available for blocks 40 of picture $32t_1$. Additionally, however, other coding modes may be available as well. For example, some blocks of depth map $34d_1$ may be predicted from already reconstructed portions 40 of picture $32t_1$ of the same time instant. It should be noted that even the coding modes assigned to blocks 44 may be adopted by reference-view reconstructor 24 from the coding modes of co-located blocks 40 of picture $32t_1$. Otherwise, the coding modes for blocks 44 and 40 are conveyed within the multi-view data stream 14. For illustration purposes, two blocks of blocks 44 of depth map $34d_1$ are exemplarily shown to be inter predicted using motion data 46, such as by copying from corresponding portions—i.e. portions pointed to by a motion vector of the motion data from a position co-located to the respective block—of a referenced, already reconstructed depth map $34d_1$ indexed, for example, by a reference index which may also be comprised by the motion data 46 optionally.

Similarly to the coding modes, motion data 46 may be adopted for motion data 42, or at least predicted therefrom. Together, motion data 42 and motion data 46 represent motion data 48 of the current picture or time instant T of view 20.

The dependent-view reconstructor 26 may operate quite the same as reference-view reconstructor 24 with dependent-view reconstructor 26, however, being configured to reconstruct the dependent view 22 from the dependent view portion 38. Accordingly, in reconstructing a current picture $32t_2$ of current time instant T, dependent-view reconstructor 26 may also use a block-wise processing using a subdivision into blocks 50 which may be fixed or signaled within multi-view data stream 14. Alternatively, depth map based inter-view prediction of the subdivision into blocks 50 as outlined in more detail below may be used by dependent-view reconstructor 26 so as to derive the subdivision into blocks 50 for view 22 from the subdivision into blocks 40 and/or blocks 44 of view 20. Dependent-view reconstructor 26 may also use such a subdivisioning into blocks 52 for depth map $34d_2$ of view 22. As far as the coding modes are concerned, dependent-view reconstructor 26 may support coding modes as they have been described with respect to the reference-view reconstructor 24. Accordingly, illustratively, two blocks 50 and two blocks 52 are exemplarily shown to be subject to inter prediction using motion data 54 and 56, respectively, so as to be appropriately copied from respective portions of a reconstructed version of previously reconstructed pictures $32t_2$ and the respective depth map $34d_2$, respectively. Together, this motion data 54 and 56 represents the motion data for the current picture or current time instance of view 22. In addition to these coding modes, however, dependent-view reconstructor 26 has the ability to support one or more inter-view prediction modes for using disparity-compensated prediction in order to copy respective blocks from portions of view 20 of the same time instant, which are spatially displaced from a co-located position by an amount and direction defined by associated disparity data. In FIG. 1, one disparity predicted block in picture $32t_2$ and the depth map $34d_2$ are exemplarily shown along with the corresponding disparity data 60 and 62, respectively. Disparity data may, for example, comprise a disparity vector or at least a disparity component along the view offset direction between views 20 and 22, and optionally a view index indicating the reference view from which the respective block of the dependent view 22 depends, which index may be favorable in case of the coexistence of more than two views as exemplarily shown in FIG. 1. Together, disparity data 60 and 62 form the disparity data for the current picture or current time instance T of view 22.

That is, reference-view reconstructor 24 and dependent-view reconstructor 26 may operate in a manner so as to reduce the redundancies between a picture and its depth map, along the time axis 30 and in inter-view direction, between views 20 and 22, as far as possible. This is also true, for example, for the prediction of the side information such as the motion data and disparity data as well as the coding modes and the subdivision information mentioned above. All of this information shows redundancies among each other in time direction, between the views and between a picture and its depth map.

Until now, the description of FIG. 1a focused on a possible base implementation for decoder 10 and reference-view reconstructor 24 and dependent-view reconstructor 26, respectively. However, the base implementation may also be different. The above description is merely to be regarded as one possible implementation, but other coding concepts underlying reference-view reconstructor 24 and other predictive block-based coding concepts for dependent-view reconstructor 26 would also be feasible.

Proceeding with a most-interesting feature of the decoder of FIG. 1a, due to the predictive coding nature of the operation of reference-view reconstructor 24, reference-view reconstructor 24 internally reconstructs a current picture of reference view 20 of the multi-view signal 12 via a prediction signal predicted from previously reconstructed portions of the multi-view signal 12, such as a previously reconstructed portion of the reference view 20, and a residual signal which reference-view reconstructor 24 derives from portion 36 of multi-view data stream 14. In particular, owing to the predictive coding nature, reference-view reconstructor 24 refines the prediction signal with the residual signal such as by adding, although other possibilities would also exist. This residual signal internally obtained within reference-view reconstructor 24 may serve as a reference residual signal 63 for dependent-view reconstructor 26. Accordingly, FIG. 1a shows reference-view reconstructor 24 as being connected to a reference input of dependent-view reconstructor 26. The dependent-view reconstructor 26 is configured to, in reconstructing the current picture of the dependent view 22, predict a residual signal for block-based predictively coding of the current picture of the dependent view 22 from this reference residual signal 63 using block-granular disparity-compensated prediction. That is, in case of the dependent-view reconstructor 26 being implemented as a hybrid video decoder as outlined above, dependent-view reconstructor 26 may support a coding option for blocks 50, or 50 and 52, according to which the residual signal for refining the prediction signal as obtained via the aforementioned block coding modes, such as intra, inter and/or inter-view block coding mode, is refined by a residual signal which, in turn, is predicted from the reference residual signal 63 by use of block-individually defined disparity displacement such a displacement vectors. That is, dependent-view reconstructor 26 may predict the residual signal for a block 50 or 52 of the dependent view 22 via copying a respective portion of the reference residual signal 63 of the current picture of the reference view 20, displaced from a location corresponding to this block of the current picture of the dependent view 22 according to the disparity displacement such as the afore-mentioned disparity vector. There are different possibilities for as to how the disparity displacement for the respective block may be obtained, with these possibilities outlined in more detail below. In any case, due to the prediction of the residual signal for the current picture of the dependent view 22, dependent-view reconstructor 26 may not even have to refine the predicted residual signal of the current picture of the dependent view based on an second order prediction signal explicitly signaled within the multi-view data stream 14 and portion 38 thereof, respectively.

Figure 10:
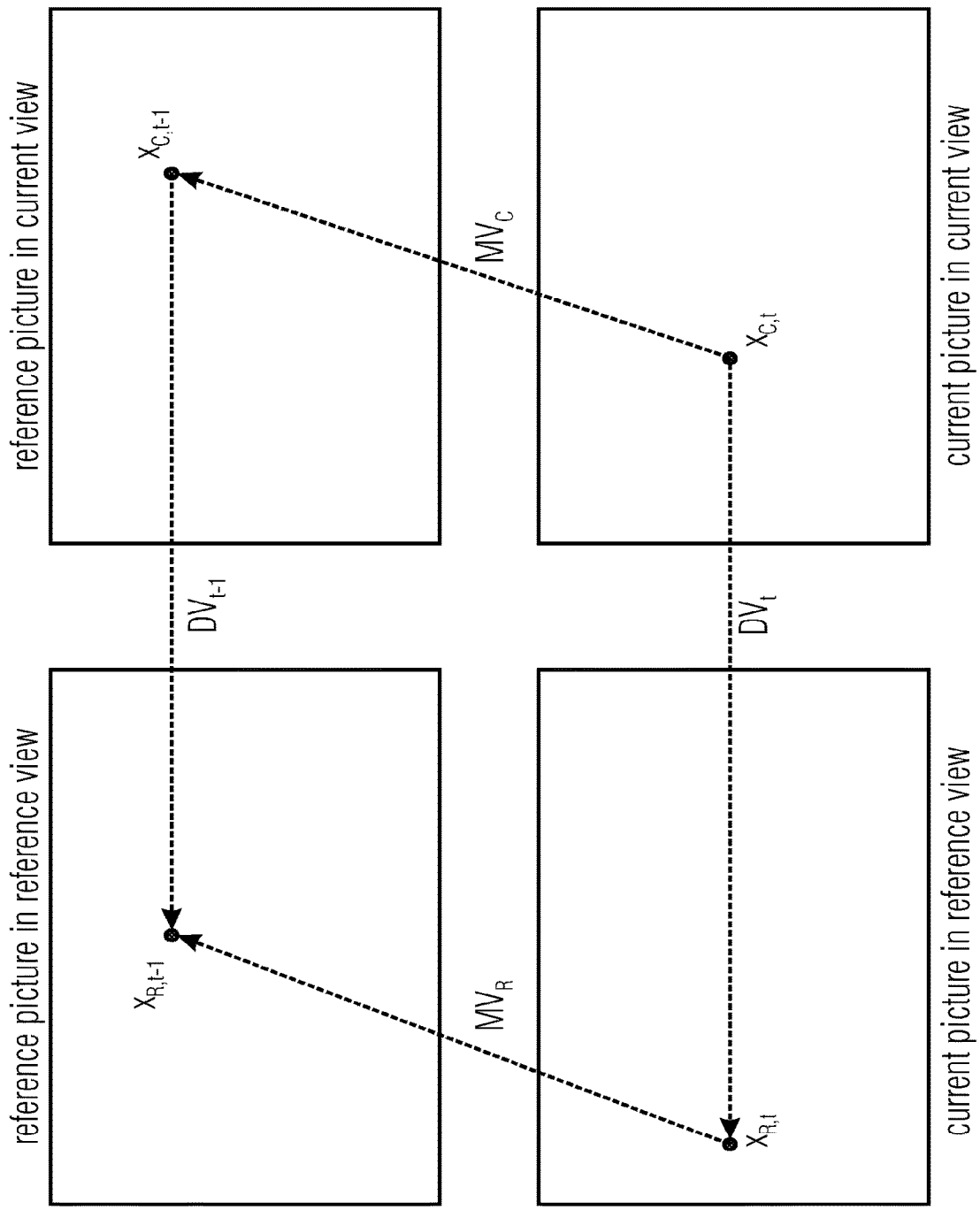
FIG. 10 shows a general relationship between projected objects points, temporal motion vectors, and disparity vectors in the pictures of different views and time instances.

Thus, in the following description, different possibilities are described for as to how to obtain the disparity displacement for the currently reconstructed block of the current picture of the dependent view 22. A further discussion will reveal different possibilities for realizing the block-based disparity-compensated prediction using the derived disparity displacement. However, before turning to the discussion of these possible implementation details, the above description of a possible base implementation is finalized with regard to further inter-view redundancy removal features which could be implemented in the decoder of FIG. 10 in case of an implementation thereof in the form of an hybrid video decoder—inter-layer redundancy removal features also using the block-based disparity compensation using the derived disparity displacement for the blocks.

For example, in order to more efficiently exploit the redundancy between views 20 and 22, the dependent-view reconstructor 26 may be configured to—with the preliminary assumption that the dependent-view reconstructor 26 has the block-individual disparity displacement at hand—predict the motion data 54 and/or 56 of inter-predicted blocks of the current picture (including its depth map $34d_2$, if present) of the dependent view 22 based on the disparity displacement for these inter-predicted blocks within view 22. Then, this predicted motion data is used in motion-compensated predicting these blocks. For example, the dependent-view reconstructor 24 may be configured to, in predicting the motion data 54 and/or 56 for a current block 50/52, use the respective disparity displacement for the current block 50/52 to locate one or more corresponding positions at the current time instant of the reference view 20 and use the motion data for the one or more blocks of the reference view 20 at the located positions to serve as a predictor for the motion data 54/56 of the current block of the current picture of the dependent view 22. Naturally, refinement data in order to signal a prediction residual for the motion data 54/56 may be comprised by the dependent view portion 38, i.e. motion residual data, and used by dependent-view reconstructor 26 to refine the motion data 54/56. Even the combination is possible: blocks 50/52 of the inter block coding mode, the motion data of which has been predicted from motion data 42/46 of blocks 40/44 located at positions determined by the respective disparity displacement for the blocks 50/52, may be refined using a residual signal which, in turn, is likewise predicted by copying a respective disparity-displaced portion from the reference residual signal.

Figure 2:
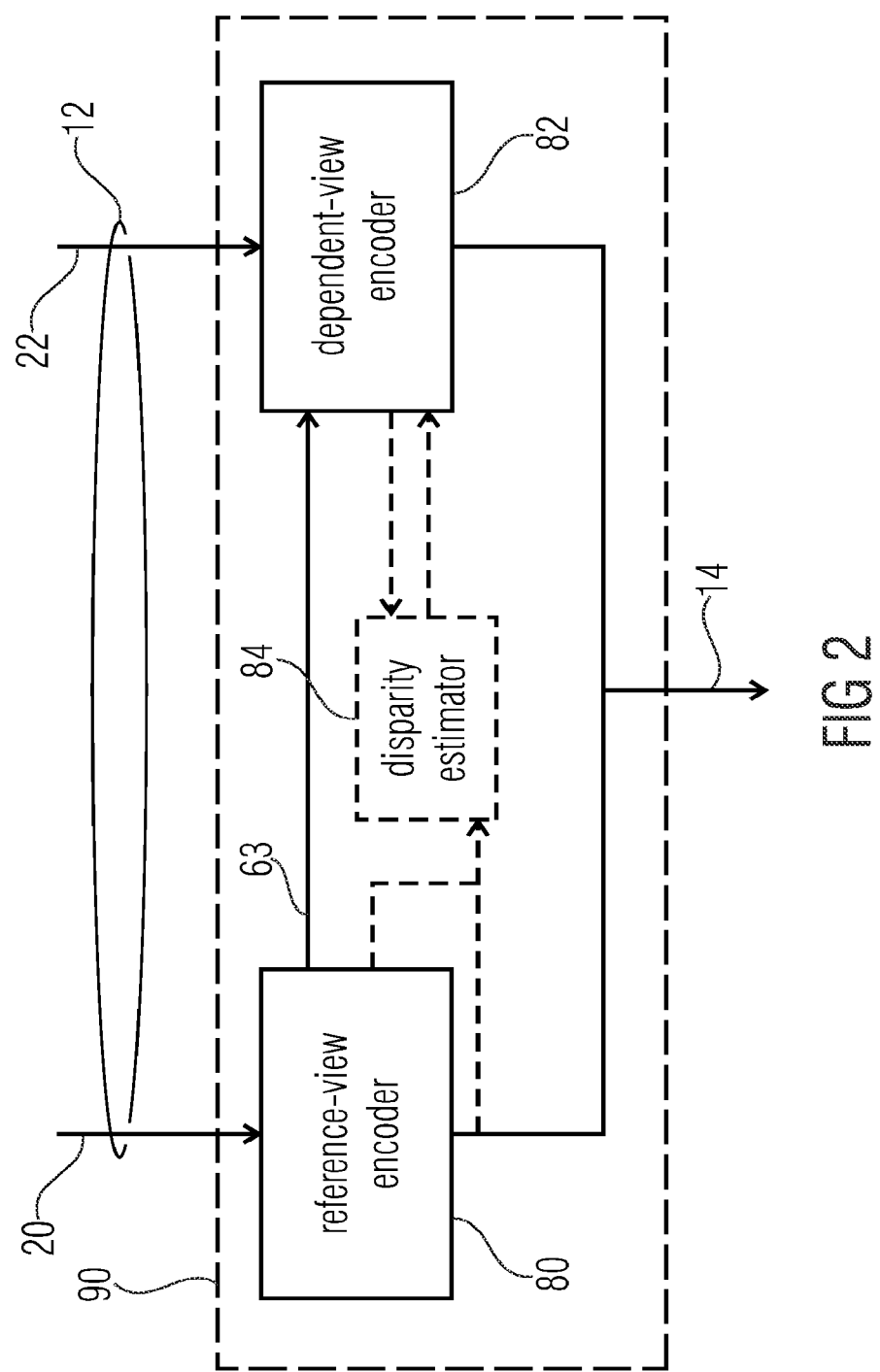
FIG. 2 shows a block diagram of an apparatus for encoding a multi-view signal fitting to the apparatus of FIG. 1 in accordance with an embodiment.

The following description is structured as follows. First, an embodiment for an encoder fitting to the decoder of FIG. 1a is described with respect to FIG. 2. Then, a more detailed implementation possibility for the decoder and encoder of FIGS. 1a and 2 is described with respect to FIGS. 3 and 4. Thereinafter, different possibilities for obtaining the disparity displacement for the individual blocks of the current picture of the dependent view are discussed. Later, specific implementation details concerning the disparity-compensated residual prediction are discussed. Then, specific possibilities for the mode of operation for the disparity estimator 28 are discussed in accordance with two specific ways of providing the disparity displacement data. Finally, further possible advantageous implementations details are described.

FIG. 2 shows an apparatus for encoding the multi-view signal 12 into the multi-view data stream 14 and comprises, to this end, a reference view encoder 80 and a dependent-view encoder 82. Optionally, encoder 90 of FIG. 2 may comprise a disparity estimator 84 connected between reference-view encoder 80 and dependent-view encoder 82. Analogously to decoder 10 of FIG. 1a, reference view encoder 80 is configured to predictively encode the reference view 20 of the multi-view signal 12 while dependent-view encoder 82 is configured to encode the dependent view 22 of the multi-view signal 12 using block-based predictive coding. The dependent view encoder 82 is configured to, in encoding the current picture of the dependent view 22, predict a residual signal of the current picture of the dependent view 22 from a reference residual signal 63 of the current picture of the reference view 20 using block-granular disparity-compensated prediction. As is known in the art, encoder 90 of FIG. 2, although acting very similar to the decoder of FIG. 1a as far as the finally chosen and finally coded prediction parameters and residual signals signaled within the multi-view data stream 14 are concerned, differs from the decoder in that the encoder may select the prediction parameters such as coding modes, the prediction parameters associated with the chosen coding modes, the accuracy of coding the residual signal and so forth, out of a magnitude of different possibilities and combinations by optimizing some cost function depending on, for example, compression rate and/or compression distortion.

As mentioned above, FIG. 3 shows a possible implementation of the decoder of FIG. 1a in more detail. According to FIG. 3, the reference-view reconstructor 24 and the dependent-view reconstructor 26 are structured very similarly, so that the following description of FIG. 3 starts with a description of the internal structure of reference-view reconstructor 24 and then proceeds with the description of dependent-view reconstructor 26.

Figure 3A:
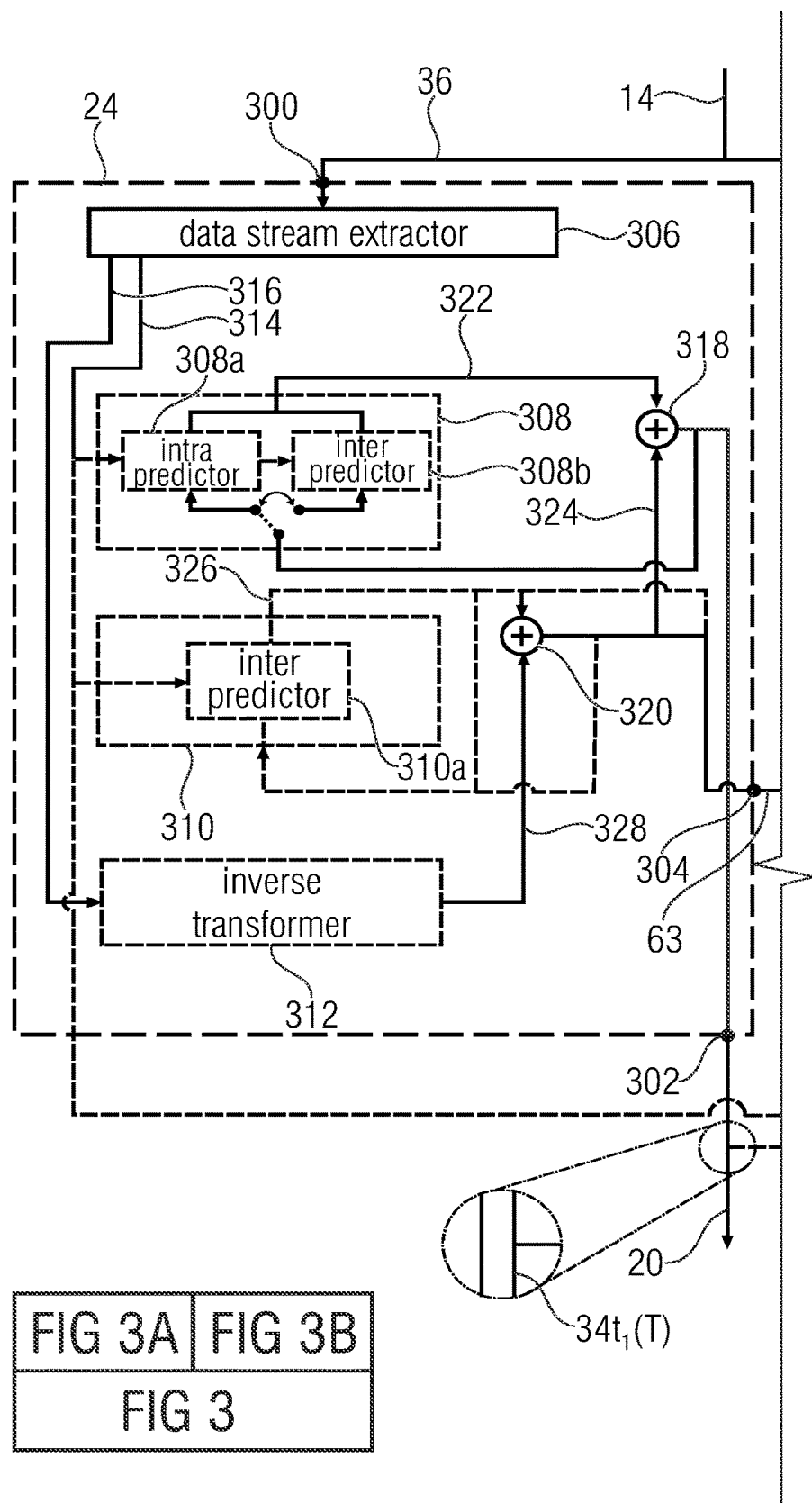
FIG. 3 shows a block diagram including FIGS. 3A and 3B of an apparatus for reconstructing a multi-view signal in accordance with a more detailed implementation of the embodiment of FIG. 1.
Figure 3B:
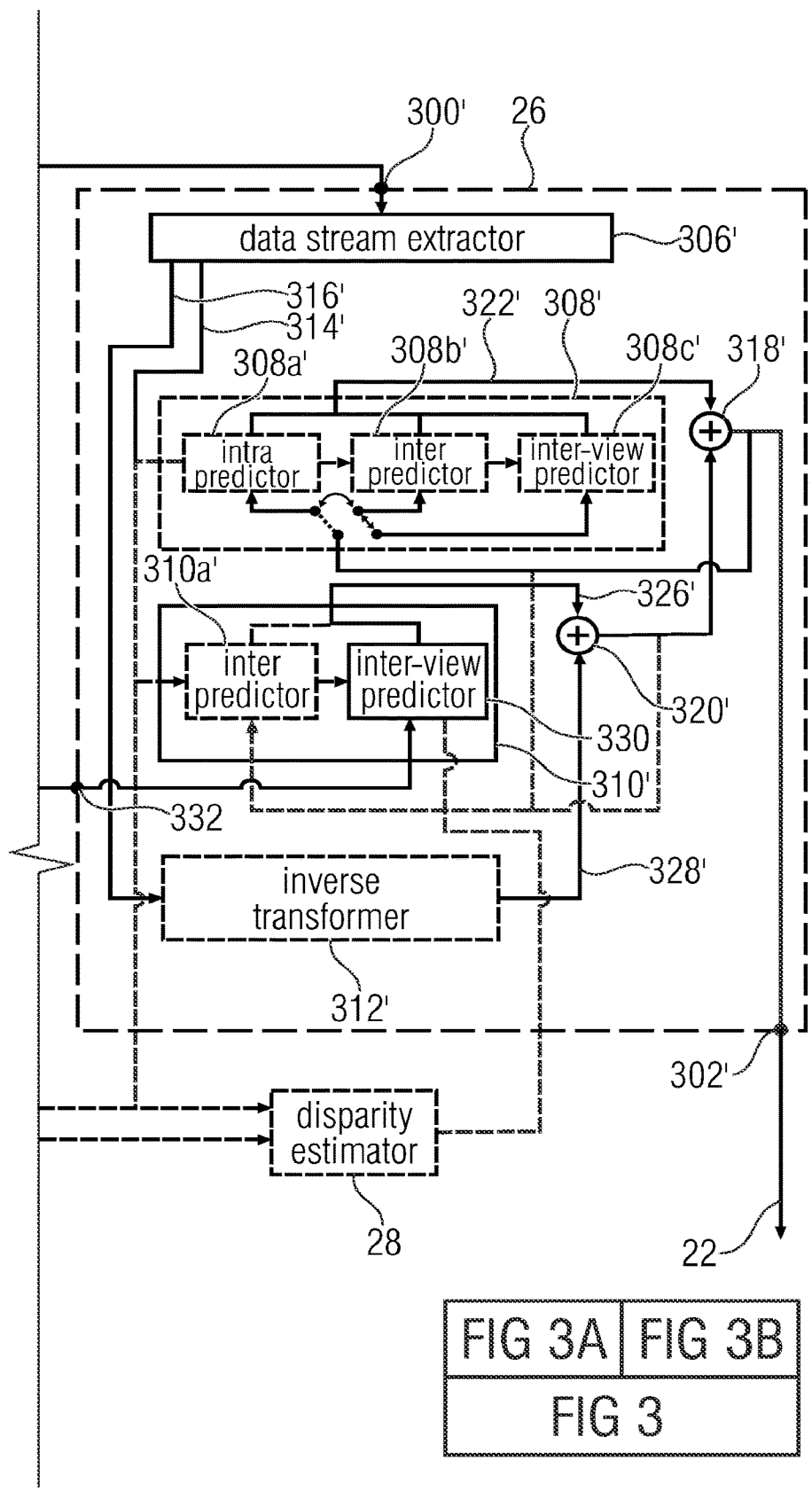

The reference-view reconstructor 24 comprises an input 300 for receiving the reference-view portion 36, and an output 302 for outputting reference signal 20. A further output 304 is provided for outputting the reference residual signal 63. Internally, reference-view reconstructor 24 comprises a data stream extractor 306, a main predictor 308, a residual predictor 310, and an inverse transformer 312. The data stream extractor 306 is configured to extract prediction parameters 314 and residual data 316 from the reference view portion 36. The extraction may be based on lossless entropy decoding such as VLC or arithmetic decoding. A prediction parameter output at which the prediction parameters 314 are output, is connected to a parameter input of main predictor 308 and, optionally, with a parameter input of residual predictor 310. A residual output of data stream extractor 306 at which the residual data 316 is output, is connected to an input of inverse transformer 312. Further, reference-view reconstructor 24 comprises a first combiner—here exemplarily depicted and embodied as an adder—318 having a first input connected to an output of main predictor 308, and an output connected to the input of main predictor 308. Likewise, a second combiner—here exemplarily also embodied and depicted as an adder—320, is provided, which has its first input connected to an output of residual predictor 310. An output of combiner 320 is connected to the second input of combiner 318, and the second input of combiner 320, in turn, is connected to an output of inverse transformer 312 so that, altogether, data stream extractor 306, inverse transformer 312 and combiners 320 and 318 are serially connected—in the order of their mentioning—between input 300 and output 302. As shown in FIG. 3, the input of the residual predictor 310 may be connected to its output or to the output of adder 320. Different options also exist for the connection to reference residual signal output 304. The output of adder 320, or the output of residual predictor 310 may be connected to output 304.

The functionality of the reference-view reconstructor 24 of FIG. 3 is as follows. The data stream extractor 306 extracts residual data 316 and prediction parameters 314 from the reference-view portion 36 of multi-view data stream 14. As already outlined with respect to FIG. 1a, the reference-view reconstructor 24 operates on a block basis so that the prediction parameters 314, for example, assign a respective block coding mode to each block of the reference view 20. For texture blocks 40 (see FIG. 1b) an intra prediction mode and an inter prediction mode may be available, with this possibility illustrated in FIG. 3 by showing the main predictor 308 as comprising an intra predictor 308a and an inter predictor 308b. The prediction parameters 314 may convey prediction parameters specific for the respective block coding mode for the respective blocks 40. For example, the intra prediction mode, which intra predictor 308a is responsible for, may be controlled via an intra prediction direction along which the current block is filled based on previously reconstructed samples of neighboring, already reconstructed blocks of the current picture. The inter predictor 308b is responsible for the inter prediction block coding mode and controlled via motion data conveyed by the prediction parameters 314 so as to copy respective portions of previously reconstructed pictures of the reference view signal 20 with the location of the portions relative to the location of the inter-predicted block, and the reference picture being indicated by the motion data. Generally, intra predictor 308a and inter predictor 308b may also be available, and may function similarly, with respect to depth blocks 44 if depth maps are transmitted within the reference view 20. However, additional predictors not shown in FIG. 3 may be available or predicting the content of the depth map within the current block 44 using already reconstructed portions of the current texture map of view 20. Altogether, the main predictor 308 provides at its output a prediction signal 322, some blocks of which have been obtained by intra prediction while others have been obtained by inter prediction. Combining this prediction signal 322 at combiner 318 with a residual signal 324 reveals the reconstructed signal, namely the reconstructed reference view 20.

Instead of explicitly transmitting this residual signal 324 in full by way of the residual data 316 for all blocks 40/44, the reference-view reconstructor 24 may, optionally, have additionally the residual predictor 310. It should be immediately noted that the residual predictor 310 forms merely an optional feature of FIG. 3 and may, alternatively, be left away, with the output of inverse transformer 312 being in that case directly connected to the second input of combiner 318 so as to provide the residual signal 324 directly. However, if the residual predictor 310 is present, same may be configured to predict the residual signal 324 temporally by motion compensated prediction so as to obtain a residual prediction signal 326 which, when combined with the second order residual signal as output by inverse transformer 312, namely 328, then forms the residual signal 324.

The intra predictor 310a of residual predictor 310 may be configured to use, as a reference, either the reconstructed residual signal 324 of previous (previously reconstructed) pictures, or the residual prediction signal 326 of such previous pictures. That is, intra predictor 310a may copy a portion out of this reference, located according to respective residual prediction motion data signaled within the prediction parameters 314 for those blocks for which the residual prediction that residual predictor 310 is responsible for, is activated.

The inverse transformer 312 uses the residual data 316 to form the second order residual signal 328 which is, for blocks for which the residual prediction is turned off, equal to the residual signal 324. The inverse transformer 312 may perform a block-wise transform such as IDCT or the like, in order to obtain signal 328 from respective transform coefficient levels within residual data 316. The transform blocks within which inverse transformer 312 performs the individual transformations may coincide with the blocks for which the block coding modes are signaled within parameters 314 or may form a subdivision thereof, with a subdivision possibly signaled within residual data 316. Alternatively, transform blocks may cross block boundaries of blocks 40/44.

Beyond the just provided description of FIG. 3, the other specific details mentioned above with respect to FIG. 1a are also valid for FIG. 3. For example, prediction parameters for a current block may be predicted from prediction parameters of previously reconstructed blocks of the same picture or a previous picture of the reference view 22. This also applies to the coding mode of the current block. Further, all of the above mentioned possibilities with regard to the subdivision of the current picture into blocks 40/44 are also valid for FIG. 3.

As already mentioned at the beginning of the description of FIG. 3, the internal structure of the dependent-view reconstructor 26 largely coincides with that of reference-view reconstructor 24, and accordingly the same reference signs are used for the internal elements of dependent-view reconstructor 26 as far as these elements likewise occurring within the reference-view reconstructor 24, are concerned. The only difference is an apostrophe used for elements within the dependent-view reconstructor 26. Focusing on the difference in the internal structure of reconstructors 24 and 26, residual predictor 310' is no longer an optional feature. Rather, the residual predictor 310' renders, at least for some blocks 50/52 of the dependent view 22, an inter-view residual prediction mode available for which an inter-view predictor 330 of residual predictor 310' assumes responsibility. An inter residual predictor 310b' may optionally also by present so as to perform a alternative way of predicting the residual, namely vie respective residual prediction motion data as described above with respect to module 310b. The inter-view residual predictor 330 is connected between a reference residual signal input 332 of dependent-view reconstructor 26 which, in turn, is connected to the reference residual signal output 304 of reference-view reconstructor 24 so as to receive the reference residual signal 63, and, via the output of residual predictor 310', to the first input of combiner 320'. A further difference to reference-view reconstructor 24, is related to the additional presence of an interview prediction mode within main predictor 308', which an inter-view predictor 308c' is responsible for. The inter-view predictor 308c' copies respective portions of the reconstructed current picture of the reference signal 20 of the same time instant, located at a position determined by disparity data associated with the respective disparity-compensated block 50/52. A respective connection connecting inter-view predictor 308c' with the output of combiner 318 of reference-view reconstructor 24 is not shown in FIG. 3 for the sake of focusing the present description to the residual prediction performed by inter-view predictor 330.

In any case, the prediction signal 322' of the dependent-view reconstructor 26 is, in accordance with the specific example of FIG. 3, composed of blocks being obtained by intra prediction, blocks obtained by inter prediction and blocks obtained by inter-view prediction. For some of these blocks for which the residual prediction option is turned on by prediction parameters 314', inter-view predictor 330 predicts the residual signal 324' by copying a respective portion out of the residual signal 324 for the current picture of the reference view, or the residual prediction signal 326 for the current picture of the reference view 20, i.e. the reference residual signal 63. The position of the respective portion is determined by inter-view predictor 330 by use of a disparity displacement specific to this block. Different possibilities exist as to how inter-view predictor 330 determines the disparity displacement for the current block, with these different possibilities outlined in more detail below.

Before beginning to describe the different possibilities for obtaining the disparity displacement underlying the block-based disparity compensated residual prediction for the embodiment of FIG. 1a and the implementation of FIG. 3, it shall be noted that not only the residual predictor 310 of the reference-view reconstructor 24 is optional, but also the inverse transformers 312 and 312', which may be left away with the second order residual signal 328 being then signaled in the spatial domain within residual data 316 rather than in the transform domain as it was described above. Moreover, the inter predictor 310b' is optional as already noted above.

Figure 4A:
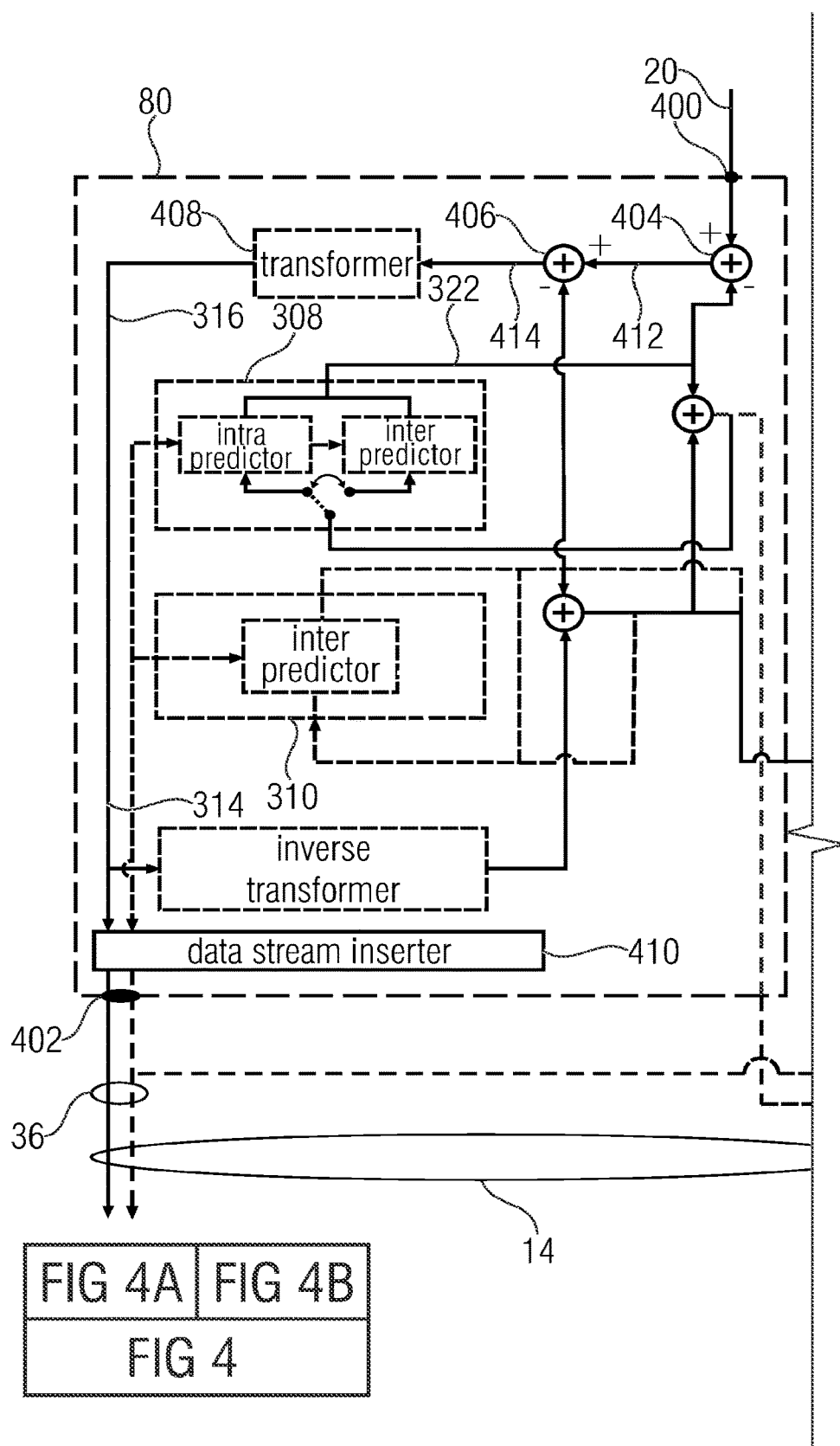
FIG. 4 shows a block diagram including FIGS. 4A and 4B of an apparatus for encoding a multi-view signal fitting to the apparatus of FIG. 3.
Figure 4B:
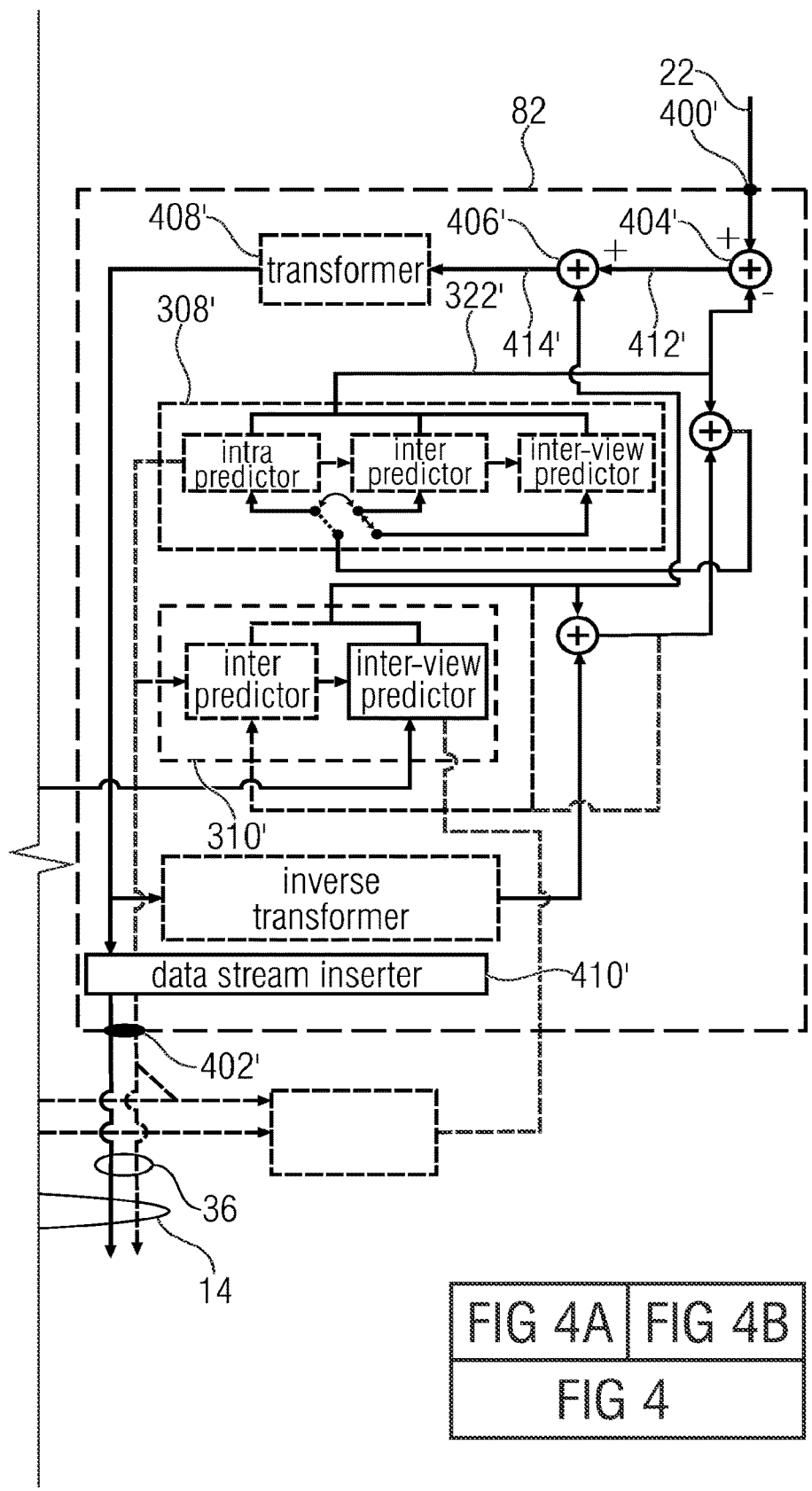

Further, for the sake of completeness, FIG. 4 shows an embodiment for an encoder fitting to the decoder of FIG. 3. Many of the elements within the encoder of FIG. 4 are equal to those, or correspond to those, indicated in FIG. 3, and accordingly, all of these elements are not described again. Rather, the elements differing from the decoder structure of FIG. 3 are described, wherein it is additionally pointed out that, naturally, the encoder of FIG. 4 first selects all the prediction parameters and the residual data finally transmitted within the data stream in accordance with some optimization routine as already outlined above.

In particular, the reference-view encoder 80 comprises an input 400 at which reference view signal 20 enters, and an output 402 at which the reference view portion 36 of multi-view data stream 14 is output. Internally, reference-view encoder 80 comprises two subtracters 404 and 406, a transformer 408 and a data stream inserter 410 connected in series to each other between input 400 and output 402. The inverting input of subtracter 404 is connected to the output of main predictor 308 so as to receive the prediction signal 322. Subtracter 406 is arranged downstream to subtracter 404 so as to have its non-inverting input connected to the output of subtracter 404. Further, the inverting input of subtracter 406 is connected to the output of residual predictor 310. As a further difference to the structure shown in FIG. 3, the main predictor 308 and the residual predictor 310 have a prediction parameter output rather than a prediction parameter input as their functionality also encompasses the finding of the optimal set of prediction parameters and sending these prediction parameters 314 finally selected to a respective prediction parameter input of data stream inserter 410. Likewise, the transformer 408 outputs the residual data 316 to a residual input of data stream inserter 410. The remaining elements of reference-view encoder 80 correspond to those indicated above with respect to FIG. 3. Likewise, the dependent-view encoder 82 differs from the construction of the dependent-view reconstructor 26 in the way indicated in FIG. 4. That is, the differences correspond to those already described with respect to the reference-view encoder 80 compared to the reference-view reconstructor 24. For the sake of completeness, it is noted that the transformers 408 and 408', which perform a spectral decomposition such as an DCT, may be left away in case of the inverse transformers 312 and 312' being left away as well.

Thus, the functionality of the encoders 80 and 82 largely coincides with the functionality described above with respect to the decoder of FIG. 3. The subtracters 404 and 406 operate on the original versions of reference and dependent view 20 and 22 so as to obtain the actual first order residual signal 412 and the actual second order residual signal 414 (which may represent the first order residual signal in case of the residual prediction mode being switched off), wherein the transformer 408 lossy encodes the actual second order signal 414 so as to derive the residual data 316, i.e. the residual data in the transform domain. The data stream inserter 410 may, corresponding to the data stream extractor 306, perform a lossless entropy coding such as VLC or arithmetic coding so as to insert the residual data 316 and the prediction parameters 314 into the reference-view portion 36 and dependent-view portion 38, respectively.

Now, after having described the embodiments of FIGS. 1a and 2, and the corresponding possible detailed implementations with respect to FIGS. 3 and 4, in the following, possible variants in order to obtain the disparity displacement underlying the block-based disparity compensated residual prediction are described with respect to these figures.

For example, in accordance with a first variant, the disparity displacement underlying the block-based disparity compensated residual prediction is obtained from an explicitly signaled depth-map $34d_1(T)$ of the current picture $32t_1$ of the reference view 20. In particular, in accordance with this variant, the reference-view reconstructor 24 is configured to predictively reconstruct the current picture $32t_1$ of the reference view 20 of the multi-view signal 12, including the depth map $34d_1$ of the current picture of the reference view 20, so as to obtain a reconstructed version of the depth map $34d_1(T)$. Looking at FIG. 3, this depth map $34d_1(T)$ may be coupled to disparity estimator 28 which, in accordance with this variant, has, to this end, a reference depth map input connected to the output 302 of the reference-view reconstructor 24, while an output thereof is connected to a depth map estimate input of inter-view predictor 330. In accordance with this variant, the disparity estimator 28 is configured to estimate the disparity displacement for a current block 50/52 of the current time instant of the dependent view 22 from the reconstructed version of the depth map $34d_1(T)$ of the current time instant T of the reference view 20, and the dependent-view reconstructor 26 is configured to predict the residual signal 324 of the current block 50/52 of the current time instant of the dependent view 22 by copying a portion of the reference residual signal 63, displaced from a location of the current block 50/52 of the current time instant of the dependent view 22 according to the disparity displacement thus estimated.

Figure 1C:
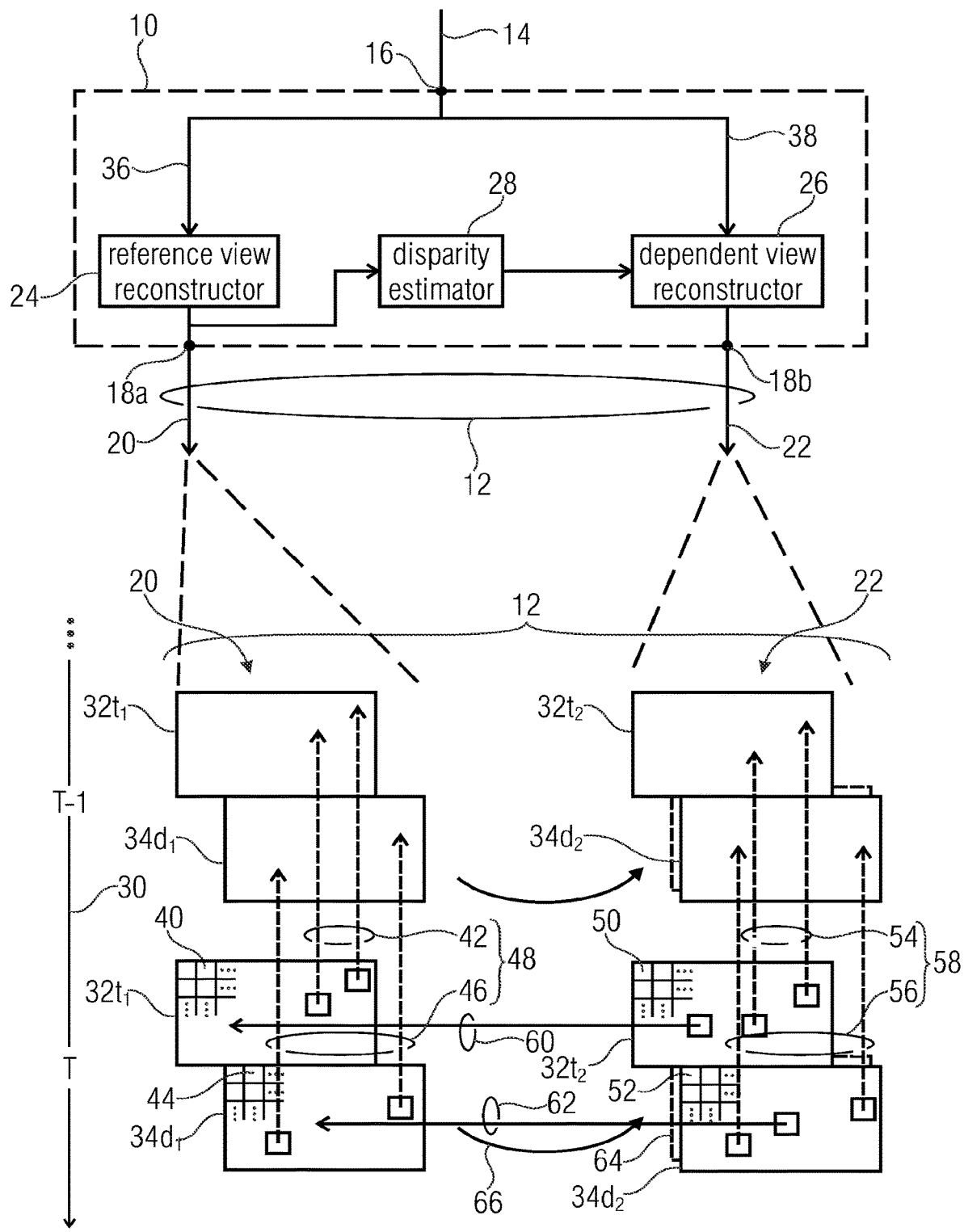
FIG. 1c shows schematically a functionality of the embodiment of FIG. 1a in accordance with a specific variant with regard to the disparity estimator.

For example, and as illustrated in FIG. 1c, the disparity estimator may warp 66 a reconstructed version of the depth/disparity map $34d_1(T)$ of the current time instant T of the reference view into the dependent 22 to obtain a depth/disparity map estimate 64 for the current time instant T of the dependent view 22 and obtain the disparity displacement for the current block 50/52 from the estimated depth/disparity map 64. This means the following. Although the description so far suggested that the depth maps indicate the depth of the scene in terms of depth values, a disparity map may be used as well since depth and disparity are related to each other in a known manner. In case of the depth/disparity maps $34d_{1,2}$ actually being depth maps, the depth estimator 28 may be configured to, in warping 66 the depth map $34d_1$ of the reference view 20 into the dependent view 22, derive disparity vectors of the current time instant T of the reference view 20 from the depth map $34d_1$ of the current time instant T of the reference view 20 and apply the derived disparity vectors onto the depth map $34d_1$ of the current time instant of the reference view 20 itself so as to obtain the depth map estimate 64. The disparity estimator 28 may then obtain the disparity displacement such as the disparity vector, for the current block 50/52 subject to inter-view residual prediction, merely by converting the depth value of this estimated depth map 64 at the location of the current block 50/52 into a disparity vector, using this disparity vector in turn in order to copy the thus determined portion from the reference residual signal, as will be outlined in more detail below with respect to FIG. 5.

In accordance with the just outlined variant, in order to derive the disparity displacement underlying the disparity compensated residual prediction, the disparity estimator 28 was present in order to provide the disparity displacement for the current block by depth-to-disparity conversion from a co-located portion of the depth map estimate 64. Favorably, this disparity displacement is available prior to starting the reconstruction of the current time instant of the dependent view 22 in accordance with the coding order outlined above. However, there are also other variants which could be used in order to obtain this disparity displacement.

In accordance with a second variant, for example, the disparity estimator 28 is configured to estimate the disparity displacement of the current block 50/52 of the current time instant of the dependent view 22—to be used for inter-view residual prediction—by spatial and/or temporal prediction from a disparity displacement associated with reference blocks within previously reconstructed portions of the dependent view, such as blocks 50/52 of the same time instant or blocks 50/52 of a previous time instant of the dependent view 22. The disparity displacement associated with such reference blocks may stem from blocks 50/52 coded using the inter-view prediction mode using respective disparity data 60 and 62, respectively. This disparity data 60/62 may serve as a basis for the estimation of the disparity displacement for the current block 50/52 of the current time instant of the dependent view 22 for which the inter-view residual prediction shall be performed. In accordance with this second variant, the disparity estimator 28 has a disparity data input connected to the prediction parameter output of data stream extractor 306' and a disparity displacement output connected to a disparity displacement input of inter-view predictor 330. That is, in that case the, dependent-view reconstructor 26 or, to be more precise, the inter-view predictor 330, may simply use the estimated disparity displacement for the current block 50/52 in order to locate an adequate portion of the reference residual signal 63 and use this portion for predicting the residual signal 324' within the current block 50/52, namely by copying the located portion.

In accordance with an alternative variant, the disparity displacement for the current block subject to inter-view residual prediction is explicitly signaled within the multi-view data stream 14 and the dependent-view portion 38, respectively. For example, the dependent-view reconstructor 26 may, in accordance with this variant, be configured to predict the residual signal 324' within the current block 50/52 by copying a portion of the reference residual signal 63 displaced from a location of the current block 50/52 according to this explicitly signaled disparity displacement. Imagine, for example, the current block 50/52 is, in accordance with the main prediction which the main predictor 308' is responsible for, associated with the inter-view block coding mode. In that case, this block 50/52 has, anyway, a disparity vector 60, 62 associated therewith. This vector may be used as the just mentioned explicitly signaled disparity displacement, too.

In accordance with a further variant, the disparity estimator 28 is configured to estimate a disparity displacement of a current block 50/52 of the current time instant of the dependent view 22 by continuously updating a depth/disparity map of a scene of the multi-view signal 12 using disparity data 60 coded into the multi-view data stream 12 for previously reconstructed pictures $32t_2$ of the dependent view 22 and motion data 42 coded into the multi-view data stream 14 for previously reconstructed pictures as well as the current picture $32t_2$ of the reference view 20 and deriving the estimated disparity displacement of the current block 50/52 of the current time instant of the dependent view 22 from the continuously updated depth/disparity map. At random access points, the depth/disparity map estimate is initialized based on the disparity data of the picture $32t_2$ at the random access point. That is, in accordance with this variant, the multi-view signal 12 may not even comprise depth maps, neither for the reference view 20 nor for the dependent view 22. Rather, in accordance with this variant, the disparity estimator 28 is configured to virtually provide such a depth/disparity map estimate by a continuous update using the information conveyed by the multi-view data stream in form of the motion data 42 and the disparity data 60. In accordance with this variant, the disparity estimator 28 has a motion/disparity input connected to the prediction parameter outputs of data stream extractors 306 and 306', and a disparity displacement output connected to a disparity displacement input of inter-view predictor 330.

Figure 1D:
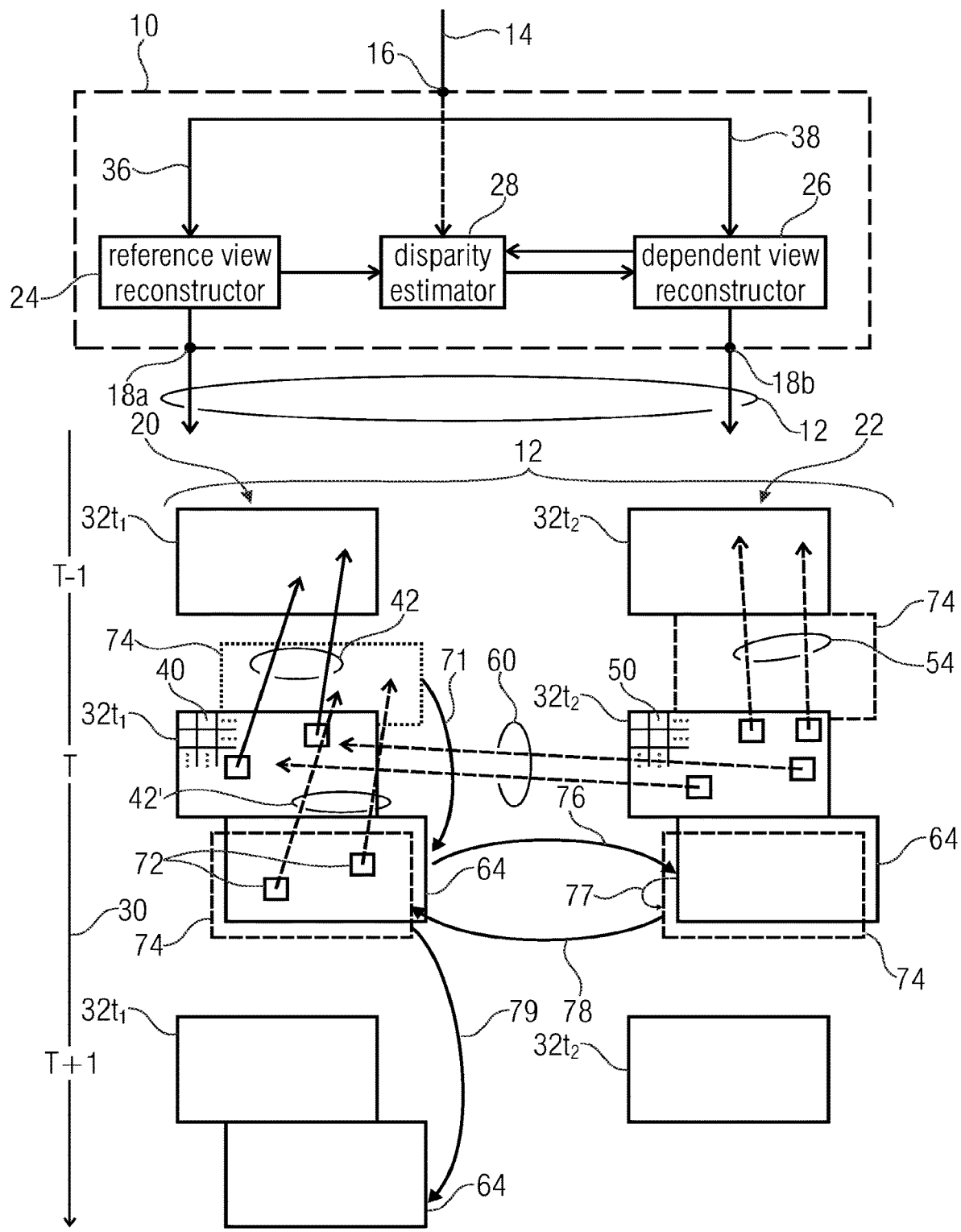
FIG. 1d shows schematically an embodiment of FIG. 1a in accordance with a further specific variant for the disparity estimator.

With regard to FIG. 1d, the just outlined variant is described in more detail. In particular, in accordance with this variant, the disparity estimator 28 ensures that each picture $32t_{1,2}$ has a depth/disparity map estimate 64 associated therewith, the estimate 64 being consecutively derived from each other in a chain of updates. That is, although the continuous update could pertain to a disparity map estimate as well, it is preliminarily assumed that the estimate concerns depth data. The disparity estimator 28 is configured to continuously update the depth map estimate 64 in a ping pong manner between views 20 and 22 primarily with the aim to provide each picture $32t2$ of the dependent view 22 with such a depth map estimate 64 in order serve as a basis for the above outlined improved inter-view redundancy reduction including the inter-view disparity compensated block-based residual prediction.

Primarily, it is assumed that the disparity estimator 28 already has access to such a depth estimate for one or more previous pictures $32t_1$ of the reference view 20 such as time instance T–1. A way how disparity estimator 28 could have gained access to this depth map estimate 74 for the previously decoded picture $32t_1$ of the reference view 20 is described further below. It should be noted, however, that such depth map data could be intermittently signaled explicitly within the multi-view data stream 14 for first pictures $32t_1$ of the reference view 20 within so called random access units, i.e. groups of pictures $32t_1$ which are decodable without reference to any previous portions of signal 12. In order to illustrate this possibility, a dashed line connects disparity estimator 28 with input 16. In the following description, a possibility is presented where the extra transmission of such starting depth map is not necessitated. Rather, the disparity data within the data stream portion 38 for the first picture $32t_2$ of the dependent view 22 in coding order within the random access unit is exploited to construct the starting depth map of the first picture $32t_1$ of the reference view 20 in coding order within the random access unit.

In particular, the disparity estimator 28 is configured to generate the depth map 64 of the current picture $32t_2$ of the dependent view 22 by applying the motion data 42 for the current picture $32t_1$ of the reference view 20 at the current time instance T onto the depth map estimate 74 of any previous picture $32t_1$ of the reference view 20 at the time instant T–1, for example. As already noted above, the reference-view reconstructor 24 reconstructs the current picture $32t_1$ of the reference view 20 using motion compensated prediction based on the motion data 42, which is signaled within the multi-view data stream 14 for the reference view 20. The disparity estimator 28 has access to this motion data 42 and uses this motion data 42 for one of the mentioned updates of the chain of updates, namely the transition 71 from the depth map estimate 74 of the reference picture $32t_1$ at the previous time instant T–1 to the depth map estimate 64 of the current picture $32t_1$ at the current time instant T. A way how this may be performed will be outlined in more detail below. Preliminarily, it shall be sufficient to note that applying 71 the motion data 42 onto the depth map 74 for the previous time instance T–1 could mean that co-located blocks 72, i.e. portions within depth map estimate 64 of the current picture $32t_1$ which are co-located to blocks 40 for which this motion data 42 has been signaled in the stream portion 36, are updated with, i.e. copied from, content of the referenced depth map estimate, i.e. the depth map estimate 74 for the picture $32t_1$ of the previous time instance T–1 at portions within the referenced depth map estimate 74 pointed to by the motion data 42' equal to motion data 42. Remaining holes may be filled by interpolation and/or extrapolation exploiting additional information offered by the intra-coded blocks among block 40 of the current picture $32t_1$. As a result, the depth map estimate 64 has been updated (or generated by transitioning from T–1 to T).

Again, disparity estimator 28 performs this update/transition 71 merely in order to prosecute further the chain of updates described further below so as to serve as a basis for deriving the depth map estimate 64 of the current picture $32t_2$ of the dependent view 22 of the same time instants T. To finalize the derivation, disparity estimator 28 warps the updated depth map estimate 64 of the current picture $32t_1$ of the reference view 20 into the dependent view 22 so as to obtain the depth map estimate 64 of the current picture $32t_2$ of the dependent view 22. That is, as the motion data 42 is defined merely at a block granularity, the update/transition 71 and the resulting depth map estimate 64 of view 22 as resulting from the warping 78 represent a quite coarse estimation of the depth, but as will be shown below such a coarse estimate is sufficient in order to significantly increase the efficiency in performing the inter-view redundancy reduction.

Although possible details regarding the warping 76 are also described further below, briefly spoken, the dependent-view reconstructor 26 may be configured to perform the warping 78 by deriving disparity vectors from the depth map estimate 64 of current picture $32t_1$ and applying the derived disparity vectors onto the depth map estimate 64 itself, so as to obtain the warped depth map estimate 64 of the current picture $32t_2$ of the dependent view 22.

Thus, as soon as disparity estimator 28 has provided dependent-view reconstructor 26 with the result of the warping 76, namely the depth map estimate 64 of the current time instant T for view 22, dependent-view reconstructor 26 is able to use this depth map estimate 64 for performing the above-outlined inter-view redundancy reduction for which possible implementations are set out in more detail below.

However, disparity estimator 28 continues to update 77 this depth map estimate 64 so as to obtain an updated depth map estimate 74 for the current picture $32t_2$ of the reference view 22 and thereby maintaining the chain of updates leading to the estimate for the next time instance T+1. Accordingly, the dependent-view reconstructor 26 is configured to update 77 the depth map estimate 64 of the current picture $32t_2$ of the dependent view 22 of the current time instance T using the disparity and/or motion data 54 and 60 for the dependent view 22 in a manner similar, at least for the motion data 54, as described above with respect to the update step 71. That is, the dependent-view reconstructor 26 uses the disparity/motion data for the picture $32t_2$ for time instance T within stream portion 38 for reconstructing this picture $32t_2$. As far as the disparity data 60 is concerned, disparity estimator 28 may easily convert the disparity vectors contained within the disparity data 54 into depth values and assign, based on these depth values, updated depth values to samples of the updated depth map estimate 79$b$ of the current picture $32t_2$ of the dependent view 22 which are co-located to the respective disparity-predicted block 50 in picture $32t_2$. The motion data 54 could be used so as to copy content of the depth map estimate 74 of the picture $32t_2$ of a referenced previous time instance T−1 of the dependent view 22, at portions thereof pointed to by motion data equal to motion data 54, into portions within the updated depth map estimate 74 of the current picture $32t_2$ which are co-located to blocks 50 for which this motion data 42 has been signaled in the stream portion 36. Remaining holes may be filled by interpolation and/or extrapolation exploiting additional information offered by the intra-coded blocks among block 40 of the current picture $32t_1$. As a result, the updated depth map estimate 74 of the current picture $32t_2$ has been updated (or generated by transitioning from T−1 to T). A possibility for as to how the depth map estimate 74 of the picture $32t_2$ of a referenced previous time instance T−1 of the dependent view 22 may have been derived at the beginning of an random access unit, is described further below. However, the above mentioned possibly explicitly transmitted depth map for view 20 at the beginning of such random access unit may be warped to view 22 to obtain the depth map estimate 74 of the picture $32t_2$ of a referenced previous time instance T−1 of the dependent view 22, alternatively.

In order to reduce blocking artifacts, the updates 71 and 77 could be performed by using weighting functions reducing the influence of the updates of the individual blocks at the block borders.

That is, on the basis of the depth map estimate 64 as obtained by warping 76, the dependent-view reconstructor 26 reconstructs the current picture $32t_2$ of dependent view 22 using disparity and/or motion compensated prediction based on the disparity and/or motion data 54 and 60 for the dependent view 22 comprised by the dependent view portion 38 of the multi-view data stream 14, and in doing so, the dependent-view reconstructor 26 provides the disparity estimator 28 with the disparity and/or motion data 54, 60, then used by disparity estimator 28 to perform update 77.

After this update 77, the disparity estimator 28 is able to warp-back 78 the updated depth map estimate 74 of the current picture $32t_2$ of the dependent view 22 into the reference view 20 so as to obtain the updated depth map estimate 74 of current picture $32t_1$ of the reference view 20 for a time instance T which may then serve as a basis/reference for the transition/update 79 to the next time instance T+1 and so forth.

From that time on, disparity estimator 28 merely repeats processes 71, 76, 77 and 78 iteratively (wherein step 79 corresponds to step 71) so as to model the depth map estimate along the time axis 30 so as to continuously support the dependent-view reconstructor 26 with the depth map estimate 64.

Further details regarding all these steps 71, 76, 77, 78, and 79 are described in further detail below. All of these further details shall be individually applicable to the description brought forward with regard to FIG. 1.

The disparity estimator 28 may then, for a current block 50/52 subject to interview residual prediction, derive the disparity displacement, such as a disparity vector, merely by converting the depth value of this estimated depth map 64, at the location of the current block 50/52, into such a disparity vector, wherein the inter-view predictor 330, in turn, uses this disparity vector in turn in order to copy the thus determined portion from the reference residual signal 63, as will be outlined in more detail below with respect to FIG. 5.

Thus, the embodiments described so far including the various variants with respect to the disparity displacement derivation for inter-view residual prediction, and possible modifications further various aspects, enable employing coded residual data 63 of already coded views 20 together with already coded disparity 60/62 and motion data 42/46 for coding a coded picture T of the current view 22 in multi-view video coding. By employing the already coded residual information 63 signaled via residual data 316 together with coded motion/disparity for predicting the residual 324' of the current/dependent view 22, the rate associated with coding the residual for the current view 22 can be significantly be reduced since only the remaining residual 328' has to be performed anymore, which results in an overall bit rate savings for the coding of multi-view video sequences.

The embodiments outlined above are applicable to general block-based hybrid coding approaches without assuming any particular block partitioning, such as macro block or sub-macro block structure. The general structure of an existing block-based coding/decoding concept does not need to be modified in order to be inserted into the above outlined way of block-based disparity-compensated residual prediction. Only an additional residual prediction step or inter-view predictor 330 needs to be integrated, so that the above embodiments can be integrated in general block-based hybrid video coding schemes with a reasonable complexity increase.

The above embodiments further provide the possibility to adaptively decide for each block (or a subset of blocks) 50/52 whether a residual prediction 330 is applied or not. The disparity information (called disparity displacement) used for referring to a block/portion of the residual 63 of already coded pictures in the reference view 22 can be derived as explained above, including the variants according to FIG. 1*c* and Fig. 1d according to which the derivation is based on coded depth maps (if present) or based on coded disparity vectors 60. In alternative embodiments, the disparity information/disparity displacement used for inter-view residual prediction can be explicitly coded as a part of the data stream 14. Further, a correction of the disparity information/disparity displacement may be signaled within the data stream as has also been noted above.

One advantage of the embodiments outlined above is that they locate the portions to be copied out of the reference residual signal 63 of already coded views 20 via disparity displacement, such as disparity vectors, the derivation of which is completely based on already coded information, such as coded motion and disparity/depth information 42 and 60 or $34d_1$, without assuming any particular structure of the actual disparity field of the scene of the multi-view signal 12. In particular, it is not assumed that the disparity field can be well approximated by a constant displacement—constant over the whole filed of view—which assumption would not mirror realistic scenes. Instead, actually coded disparity information, such as the disparity data 60/62 or the depth maps 34$d_1$ of the reference view, are used for accessing the residual 63 of an already coded view such as the reference view 22.

Furthermore, the embodiments outlined above allow that inter-view residual prediction is used for two types of blocks, namely blocks for which motion data 54/56 is derived based on motion data 42/46 in an already coded view, such as the reference view 20, and blocks for which motion data 54/56 has been explicitly transmitted (for example, using spatial or temporal motion vector prediction or without such prediction). That is, the reference-view reconstructor 24 and the dependent-view reconstructor 28 may be configured to use motion compensated prediction so as to reconstruct the current pictures of the reference and dependent view, and the dependent-view reconstructor 26 may be configured to predict motion data 54/56 of the current picture of the dependent view 22, underlying the motion compensated prediction, by locating corresponding positions in the current picture of the reference view 20 using the derived disparity displacement, and using the motion data for the current picture of the reference view 20 at the corresponding positions to predict the motion data 54/56 of the current picture of the dependent view. The dependent-view reconstructor 26 may then be configured to predict the residual signal of the current block of the current picture of the dependent view, remaining after motion compensated prediction using the predicted motion data, by copying a portion of the reference residual signal 63 of the current picture of the reference view, displaced from a location of the current block of the current picture of the dependent view 22 according to the disparity displacement (which had also been used for this block for inter-view motion data prediction.

The disparity displacement, such as the disparity vectors, which are used for accessing the reference residual signal 63, can be defined with a sub-sample accuracy, in which case the inter-view residual prediction includes an interpolation of the already coded residual, i.e. the reference residual signal 63, at sub-sample locations. That is, the dependent-view reconstructor 26 (and inter-view predictor 66, respectively) may be configured to perform the block-granular disparity-compensated prediction using disparity vectors defined at sub-sample resolution.

Moreover, advantageously, the inter-view residual prediction may be supported for more than one block size.

In some embodiments of the invention, a disparity correction vector can be additionally included in the data stream 14 for such inter-view residual predicted blocks in order to make the inter-view residual prediction more flexible. More generically speaking, the dependent-view reconstructor 26 (and inter-view predictor 66, respectively) may be configured to refine a disparity displacement for a current block of the current picture of the dependent view 20 using an explicitly signaled disparity displacement residuum explicitly signaled within a multi-view data stream 14 (or 38), and predict the residual signal of the current block of the current picture of the dependent view 20 by copying a portion of the reference residual signal 63 of the current picture of the reference view, displaced from a location of the current block of the current picture of the dependent view according to the refined disparity displacement.

Thus, the concept underlying the above embodiments and the possible variations outlined below can be decomposed into the following steps.
  Derivation of depth/disparity data for the current picture of the current view.
  Residual prediction using a derived disparity vector, and
  Signaling the usage of residual prediction inside the data stream.

Regarding the latter signalization, it should be noted that naturally the interview residual prediction could alternatively be applied to every block, or the activation of the interview residual prediction could be determined in the same manner at encoder and decoder sides based on previously coded/decoded portions of the data stream in which cases no signalization would have to be provided.

In the following, the just-mentioned steps including embodiments are described in more detail. All steps are described for block-based coding and translational disparity vectors. The embodiments—also the above outlined embodiments—are, however, also applicable to more general schemes in which a generalized set of samples such as a non-rectangular part of a block, or any other shape, is associated with a unique set of disparity parameters for defining the disparity displacement. These embodiments are also applicable for coding schemes in which the disparity compensation of the residual is carried out using higher order motion models such as affine motion models, or N-parameter motion models.

In the following, different possible implementation details regarding inter-view residual prediction are described, such as, for example, the way as to how the disparity displacement based on which the residual prediction, such as the residual prediction signal 326', for a current block, such as block 50 or block 52, is actually preformed, may be derived from a depth map estimate 64, is described in more detail. In particular, it is assumed that the disparity displacement underlying this inter-view block-based disparity-compensated residual prediction is derived in the form of a disparity vector. That is, a block of a current picture in a particular view, such as view 22, that is not the backwards compatible base view, such as 20, is inter-view residual predicted using a disparity vector and while different embodiments for deriving such a disparity vector have been described above, the embodiments which will be described in the following, concern those embodiments where the derivation of the disparity vector is performed via the depth map estimate 64 the estimation of which as been described in accordance with variants of FIG. 1c and FIG. 1d. Details concerning the actual locating procedure within the reference residual signal 63 are also described.

That is, in the following description, we preliminarily assume that an estimate of the depth map already exists. With respect to FIG. 1c and FIG. 1d it has already been outlined as to how such estimate may be obtained. Later, we describe how this depth estimate can be derived in even more detail.

The depth data 64 for the current picture may either given by a pixel-wise or a block-wise depth map. If a pixel-wise depth map is given, the depth map specifies a depth value for each sample (or each luminance sample) of the associated picture. If a block-wise depth map is given, the depth map specifies a depth value for an M×N block of samples (or luminance samples) for the associated picture. For example, a depth value for each block of the smallest possible block size (e.g., 4×4 or 8×8 block) that can be used for motion compensation could be specified. Conceptually, a depth value d given by a sample of the depth map, specifies a function of the real-world depth z, which is the distance between the associated real-world object point (the projection of the real-world object point is the image sample at the given position) and the camera:

$$d = f_{dz}(z)$$

The depth values are given with a particular precision (furthermore, depth values are often estimated, since the actual depths are usually not known). In most cases, depth values are given by integer numbers. Given the depth values and particular camera parameters (such as the focal length, distance between cameras, minimum and maximum depth values, or functions of these parameters), the depth value d can be converted into a disparity vector $v=[v_x, v_y]^T$:

$$v(x) = f_{xd}(d(x), x)$$

where $f_{vd}$ specifies the function that maps a depth value d at sample location $x=[x,y]^T$ to a disparity vector. In a particular important setup is the one-dimensional parallel camera configuration, which is characterized by the following properties:

- all cameras of the camera array are of the same type and have the same focal length
- the optical axes of all cameras are parallel and lie inside the same plane
- the scan lines of the image sensors are parallel to the plane that contains the optical axes In this case, the vertical component of the disparity vector is zero, $v=[v,0]^T$. Each real-world object point has the same vertical location in all views. Its horizontal location depends on the depth of the object point. The difference between the horizontal locations is given by the disparity $$v = f_{vd}(d).$$

In an important case, the relationship between the real-world depth z and the depth values d is given in a way that a linear relationship between the disparity v and the depth value d is obtained $$v = m_{vd} \cdot d + n_{vd},$$

where $m_{vd}$ and $n_{vd}$ and are given by the camera parameters. The depth values d are usually given as integer values. And for internal calculations it is usually also advantageous, if the obtained disparity values are integer values. For example, the disparity can be expressed in the same units that is used for the motion/disparity vectors in motion/disparity-compensated prediction (e.g., half-, quarter-, or eighth-sample accuracy). In this case, the integer values for the disparity can be obtained by the integer equation $$v = [(m]^*_{vd} \cdot d + n^*_{vd}) >> u_{vd},$$

where ">>" specifies a bit shift to the right (in two's complement arithmetic), and $m_{vd}$ and $n_{vd}$ are scaled (and rounded) versions of and, respectively.

Using the described basic relationships between the given depth values and the actual disparity, we describe embodiments for inter-view residual prediction using a disparity vector that is derived based on the given depth values (or estimate of the depth values) for the current picture of the current/dependent view 22.

Derivation of the Residual Signal for a Coded Picture

In the following, an embodiment for deriving the above outlined reference residual 63 is described in more detail. In this section, it is assumed that the residual prediction in the form of block 310 is not used within the reference view coding path including reconstructor 24 and encoder 80, although the details outlined below are easily transferable to this case. In other words, it is preliminarily assumed that the residual predictor 310 in FIG. 4 does not exist, in which case the output of inverse transformer 312 is directly connected to the second input of combiner 318 and the reference residual signal output 304, respectively. Then, the subtracter 406 is also not present and the output of subtracter 404 is connected to transformer 408 directly.

In that case, the residual signal 412 for a block of the reference signal such as block 40 or 44, is the difference between the original signal entering input 400 for the block, and the prediction signal 322 that is used for predicting this block. The residual signal 412/414 is coded using transform coding within transformer 408, which includes quantization so that the reconstructed residual as obtained at the output of inverse transformer 312 is not equal to the difference between original and prediction signal as output by subtracter 404. Thus, the reconstructed signal as output by combiner 318 such as obtained by adding the coded residual as output by inverse transformer 312 to the prediction signal 322, is also not identical to the original signal input at input 400. In order to obtain a residual picture for a given coded picture of the reference view 20, the residual signals for the blocks 40/44 of the reference view are reconstructed by the inverse transformer such as by scaling and inverse transforming the transmitted transform coefficient levels 316, and arranged to form a residual picture within which the inter-view predictor 330 locates the block/portion to be copied for an inter-view residual predicted block 50/52 of the dependent view using the disparity displacement derived for this block as outlined above and further below. This formed residual picture then forms the reference residual signal 63 passed on to the dependent-view reconstructor 26.

In embodiments of the invention, the residual picture finally used for the reference residual signal 63, is varied in that residuals as obtained by inverse transformer 312 for intra-coded blocks 40/44 are set equal to zero, since the residual for intra coded blocks has different characteristics and cannot be efficiently used for predicting the residual 324' of interview residual prediction coded blocks 50/52. In some embodiments of the invention, the residuals for the disparity-compensated blocks, i.e. blocks that are predicted using already coded pictures of even different views as a reference picture (this would be possible if the reference view 20 itself forms a dependent view of an even more basic underlying reference view), are set equal to zero-additionally or alternatively. In other words, the reference-view reconstructor 24 may be configured to perform the reconstruction of the current picture of the reference view 20 of the multi-view signal 12 using block-based hybrid coding involving at least one intra or interview block coding mode and at least one temporal inter block coding mode, and the dependent-view reconstructor 26 may be configured to, in predicting the residual signal of the current picture of the dependent view 22 from the reference residual signal 63 of the current picture of the reference view, set the reference residual signal 63 to zero within blocks of the current picture of the reference view 20 of the intra or inter-view block coding mode. Out of this modified reference residual signal 63, the residual signal prediction is then copied using the disparity displacement.

The generation of a particular residual block, i.e. the actual block copying, performed by inter-view predictor 330, which residual block is then used for the inter-view residual prediction, can also be performed during the actual process of inter-view residual prediction, i.e. online on demand. That is, it is not necessitated that the complete residual picture, i.e. the residuums of all blocks of the current picture of the reference view in a format put together, as generated before another picture, such as the current picture of the dependent view, is coded/decoded.

Derivation of a Disparity Vector for a Given Block

In the following, it is assumed that a disparity vector is used to define the disparity displacement which specifies which portion out of the reference residual signal 63 of an already coded picture of another view is used for the inter-view residual prediction. In the following, different embodiments for obtaining such a disparity vector for a given block 50/52 are described.

In particular, firstly it is assumed that the inter-view predictor 330 has access to a depth map estimate in accordance with any of the variants of FIGS. 1c and 1d. As described above, the inter-view predictor 330 may alternatively determine the disparity vector in another way such as described above with respect to the other variants.

In an embodiment, first a representing depth value d of the given block 50/52 subject to inter-view residual prediction, is obtained by inter-view predictor 330 based on the given sample-based or block-based depth map 64. In one embodiment, a particular sample location x of the given block, which may be the top left sample, the bottom right sample, a middle sample, or any other particular sample, such as any other set of corner samples, may be considered. The depth value d=d(x) that is associated with the sample (as given by the given block-wise or sample-wise depth maps 64) is used as representing depth value. In another embodiment, two or more sample locations $x_i$ of the given block (for example, the corner samples or all samples) are considered and based on the associated depth values $d_i=d(x_i)$, a representing depth values d is calculated as a function of the depth values $d_i$. The representing depth value can be obtained by any function of the set of depth values $d_i$. Possible functions are the average of the depth values $d_i$, the median of the depth values $d_i$ the minimum of the depth values $d_i$, the maximum of the depth values $d_i$, or any other function. After obtaining the representing depth value d of the given block, the depth value is subject to a depth-to-disparity conversion within disparity estimator 28 so as to convert this depth value into a disparity vector $v=f_{vd}(d)$, where the relationship between depth and disparity may be given by coded camera or conversion parameters which parameters may alternatively be set by default. In specific configurations, only horizontal displacements are possible and the depth can be estimated in a way that the depth value is equal to the horizontal displacement.

In another embodiment, a disparity correction vector is coded within the data stream such as within the prediction parameters 314' and the disparity vector that is used for inter-view residual prediction by inter-view predictor 330 is obtained in the inter-view predictor 330 before use thereof, by adding the explicitly signaled and coded disparity correction vector as obtained from the prediction parameter 314', to the derived disparity vector derived, for example, from the disparity estimator 28 or from other disparity information contained within the prediction parameters 314' as already outlined above. Namely, a disparity correction vector may, in accordance with a further embodiment, be coded and the prediction for the disparity vector for the current block to which the disparity correction vector is added, may be obtained by disparity estimator 28 by a spatial prediction using the disparity vectors of neighboring blocks 50/52 of the same time instant of the current/dependent view 22 and/or by a temporal prediction using the disparity vector of possibly co-located blocks in a temporal reference picture of view 22. The block in a temporal reference picture may even be indicated by an explicitly coded motion vector so as to be used by inter-view predictor 330 to access the correct block within the temporal reference picture from which, in turn, the disparity vector is derived which, in turn, is used for accessing the appropriately positioned block/portion out of the reference residual signal 63.

Residual Prediction for a Block Using a Derived Disparity Vector

Given the derived disparity vector for the current block 50/52, the inter-view residual prediction, such as within inter-view predictor 330, may be performed as follows. In particular, the location of the current block, i.e. the block 50/52 to be subject to inter-view residual prediction, is displaced by the determined disparity vector, and the residual block (with the same block size as the current block) at the displaced location in the reference view picture is used as residual prediction signal.

Figure 5A:
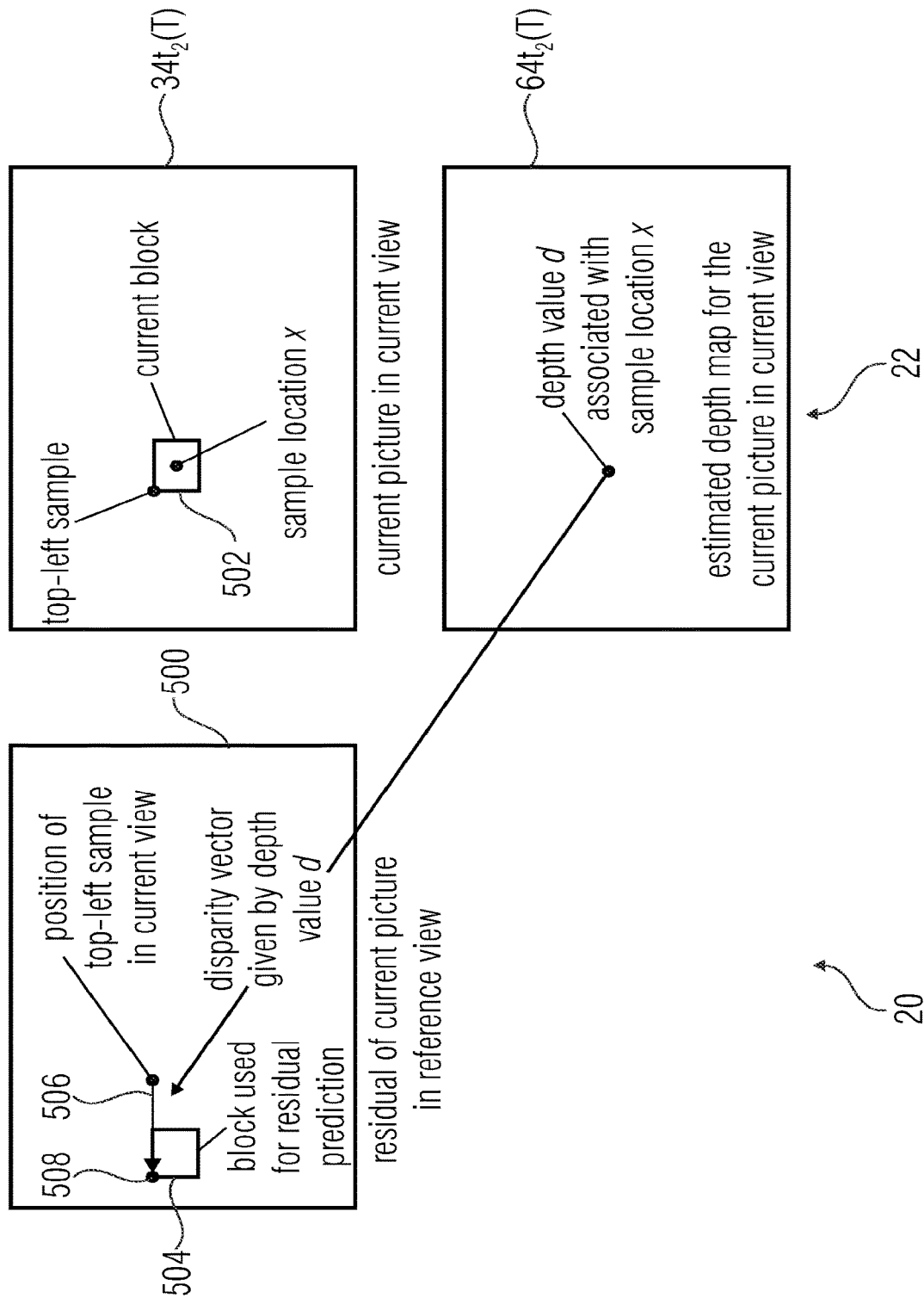
FIG. 5a shows a concept of determining a residual block in an already coded view that is used for predicting the residual of a current block in a current view (example with actual data)
Figure 5B:
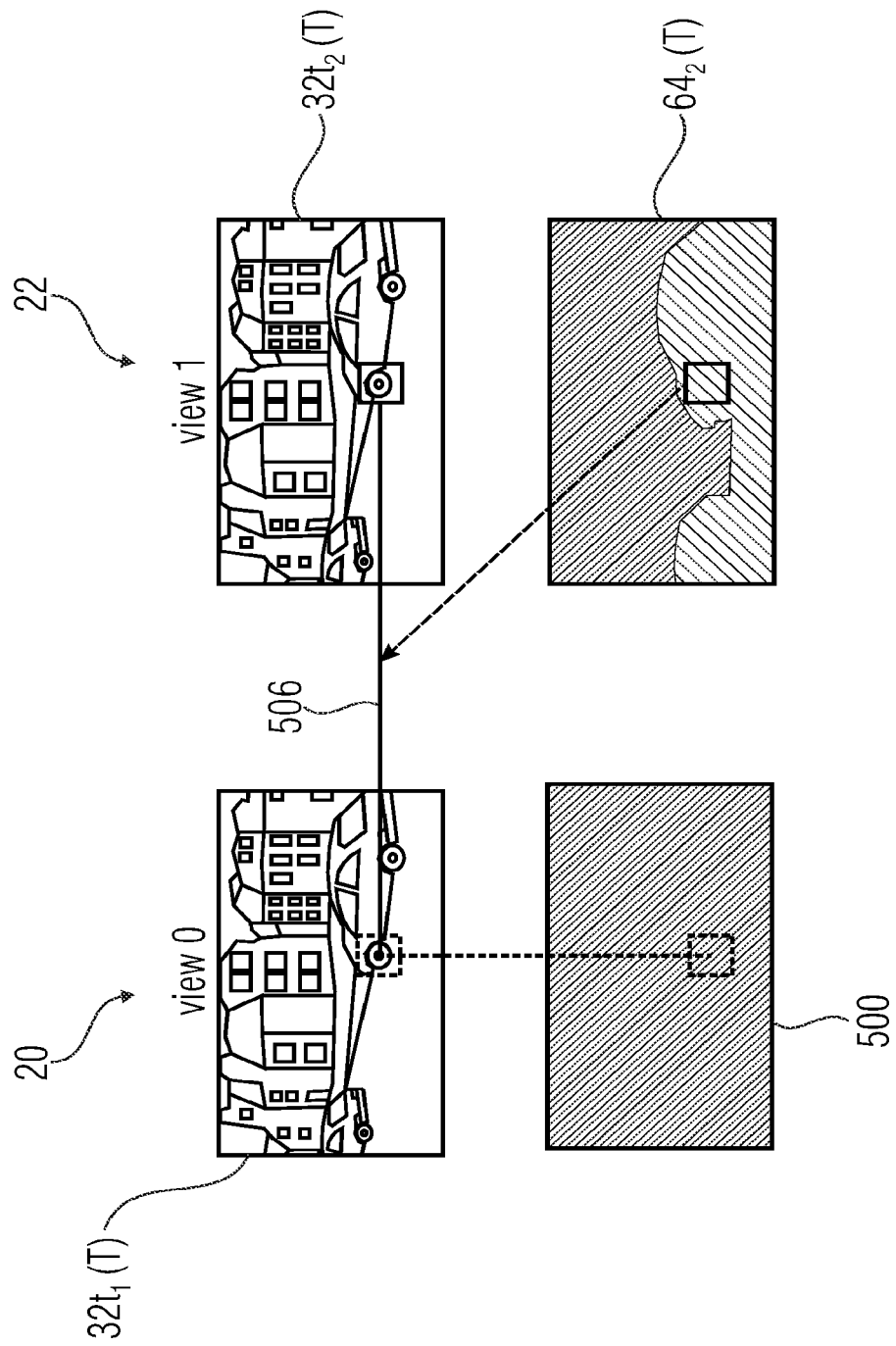
FIG. 5b shows a concept of determining a residual block in an already coded view that is used for predicting the residual of a current block in a current view (example with actual data)

In order to explain the inter-view residual prediction derivation in more detail, reference is made to FIGS. 5a and 5b. FIG. 5a,b show the current picture $34t_2(T)$ of the dependent view, the reference residual signal, i.e. the reference residual picture, 500 for the current picture $32t_1(T)$ of the reference view and the estimated depth map $64_2(T)$ for the current picture $34t_2(T)$ of the dependent view. As noted above, the residual picture 500 may be the residuum 324 which, when added to the prediction signal 322, reveals the reconstruction of the current picture $32t_1$.

The block within picture $34t_2(T)$ which is to be subject to inter-view residual prediction, is indicated at 502. The content of the block 502 may have been predicted by any of the block coding modes in blocks 308'a to 308'c, or any combination thereof, with "combination" encompassing pixelwise adding as well as spatial subdivision. That is, although it is advantageous that the boundary of block 502 coincides with that of a block to which one coding mode is assigned, alternatively, different portions of block 502 may have been associated with different block coding modes. That is, the coding concept as described so far could also be modified to the extent that block 502 does not correspond to any of the blocks to which the individual coding modes are assigned, but to a block of a further subdivision which might be different from the block coding mode subdivision and is for deciding as to whether inter-view residual prediction is to be used or not.

In order to determine the portion/block 504 within the reference view 22 from which the residual signal for the current block 502 is to be predicted by inter-view disparity-compensated residual prediction, the location of the current block 502 is, frankly speaking, displaced by the determined disparity vector 506, and thus block 504 represents a residual block out of the residual picture 500 for the current picture of the reference view 20, having the same block size as the current block 502 and being displaced from a position co-located to the position of block 502 via disparity vector 506. The location of block 508 is obtained as follows.

In the encoder, the derived residual prediction signal within block 504 is subtracted (such as by subtracter 406') from the original residual signal 412' of the current block 502 which, in turn, is the difference between the original signal of block 502 and the prediction signal 322' thereof as derived by, for example, motion/disparity-compensated prediction or intra prediction. The remaining signal, i.e. 414', is then coded, such as indicated above using transform coding including quantization.

At the decoder side, the coded residual signal 316 which is, as outlined above, exemplarily obtained by inverse scaling and transformation of the transmitted transform coefficient levels within data 316, and the residual prediction signal 326', are added to the prediction signal 322' derived by, for example, motion/disparity-compensated prediction or intra prediction, in order to obtain the reconstructed signal for the block 502 as output by the output of adder 318 in FIG. 3.

The exact way of deriving the location of residual block 504 may be as follows. One or more first sample positions x are used to identify depth values within depth map estimate $64_2(T)$, from which a representative disparity vector is determined, namely disparity vector 506. This might be done by firstly looking-up the one or more depth values in map $64_2(T)$ and then forming a common depth value therefrom such as by averaging. Then, a depth-to-disparity conversion is performed to obtain vector 506. However, it would be possible to switch averaging and conversion. In order to apply the disparity vector 506, another determination of a certain position of the current block 502 is performed such as a vertex thereof or the like. In FIG. 5*a* it's exemplarily the top-left sample. The position thereof in the reference view 20, i.e. determined by the same coordinates, is used as a foot point for vector 506 which, thus, determines the corresponding position of block 504, i.e. here the top-left corner thereof, thereby determining the position of block 504.

In one embodiment of the invention, sample-accurate displacement vectors 506 are used so that a sample of the reference residual 63, 500 is directly used for predicting a sample of the current residual 326'.

In another embodiment of the invention, sub-sample accurate displacement vector 506 (for example, quarter-sample accurate displacement vectors) are used. In this case, the residual prediction includes an interpolation of the reference residual signal 63, 500. A residual sample at non-integer locations may be found by filtering the surrounding residual samples in 63, 500. In one embodiment, the interpolation is performed in a way that only samples of a single transform block (a block of samples that was represented by a particular transformation) are used for generating a particular sample at a sub-sample location, i.e., the interpolation filter is not applied across transform boundaries of modules 312' and 408'. That is, as outlined above, the reference-view reconstructor 24 may be configured to, in reconstructing the current picture of the reference view 20, use transform residual coding, wherein the dependent-view reconstructor 26 might be configured to, in predicting the residual signal of the current picture of the dependent view, apply an interpolation filter onto the reference residual signal 63 section-wise so as to not apply the interpolation filter across transform boundaries of the transform residual coding of the reference-view reconstructor.

In a further embodiment, the reference residual samples 63, 500 are filtered before they are used for a prediction of the residual of a current block. As an example, such a filtering can be used for reducing the high-frequency (or low-frequency) components of the residual blocks. When a filtering is combined with the usage of sub-sample accurate displacement vectors 506, the filtering can be performed before or after the interpolation (i.e., the original reference residual samples or the generated residual samples at non-integer locations can be filtered).

It is also possible that the residual prediction is not directly done in the spatial domain, but in the transform domain. i.e., the residual prediction signal 63 may be transformed and the resulting transform coefficients are added to the transform coefficients for the transmitted residual signal, then the final residual signal (which is added to the motion/disparity-compensated prediction signal) is obtained by an inverse transform of the accumulated transform coefficients. The transform of the residual prediction signal may include a quantization.

In that case, the inverse transformer 312' would be positioned between the output of combiner 320' and the input of combiner 318 instead of the position indicated in FIGS. 3 and 4.

Signaling the Usage of Residual Prediction

In one embodiment of the invention, the usage of residual prediction can be adaptively chosen for a given block. Hence, the usage of residual prediction needs to be signaled to the decoder.

In one embodiment of the invention, a syntax element (for example, a flag) is included into the syntax for all motion/disparity-compensated blocks (but not for intra blocks) and indicates whether residual prediction is applied for the corresponding block. Intra-blocks are decoded without residual prediction. In another embodiment of the invention, the syntax element is only transmitted for motion-compensated blocks (but not for intra blocks and disparity-compensated blocks); whether a block is coded using motion or disparity compensation is signaled by the reference picture index or any other syntax element. If the syntax element indicating residual prediction is not transmitted, residual prediction is not used for the corresponding block.

In addition, the presence of the syntax element indicating residual prediction (and thus the possible usage of residual prediction) can be conditioned on any of the following (including all possible combinations):

- The syntax element is transmitted only for a subset of the supported block sizes, for example, only for block that are larger or equal to a minimum block sizes.
- The syntax element is transmitted only for particular coding mode. For example, the syntax element can only be transmitted for block that are not coded in a merge or skip mode.
- The syntax element is only transmitted if the residual prediction signal contains at least a particular number of non-zero samples (for example, at least one non-zero sample). Or the syntax element is only transmitted if a transform and quantization of the residual prediction signal results in at least a particular number of transform coefficients.

Furthermore, the presence of the syntax element indicating residual prediction may depend on the motion hypotheses that are used for predicting the current block and the reference block or blocks. The reference block (or blocks) is (are) coded blocks in the reference view that are located in the reference view and cover at least one sample of the residual block that is used for residual prediction. That means, the reference blocks can be derived by displacing the location of the current block by the determined disparity vector v. The corresponding conditions for transmitting the residual signal may include any of the following:

- The syntax element is only transmitted if a reference block is not intra coded.
- The syntax element is only transmitted if a reference block is coded using motion-compensated prediction (using a temporal reference picture), or only motion-compensated prediction.
- The syntax element is only transmitted if at least one of the employed reference pictures for the reference block has the same time instant as one of the reference pictures used for the current block. Instead of the time instant, similar measures such as the picture order count or the reference index (in combination with a reference list) can be used.

The syntax element is only transmitted if reference pictures of the same time instant are used for both the reference block and the current block. It means, neither the current nor the reference block refer to an access unit that is not used by the other block. Instead of the time instant, similar measures such as the picture order count or the reference index (in combination with a reference list) can be used.

The syntax element is only transmitted if the difference between the motion vectors that are used for a particular time instant (or picture order count, reference index) for the reference and the current block is less than or equal to a particular threshold. The motion vector difference can be measured as a component-wise difference or the absolute value of the difference vector or any similar measure. As an example, the syntax element is only transmitted if both motion vectors are the same or only if the difference for each motion vector component is less than or equal to a quarter-sample.

Besides the transmission of a syntax element that indicates the usage of residual prediction, a disparity correction can be transmitted (see above). The transmitted disparity correction can consist of two components (a horizontal and a vertical component), or it can consist only of the horizontal component while the vertical component is inferred to be equal to 0. The presence of the disparity correction can depend on the value of the syntax element that indicates the usage of residual prediction. Furthermore, the presence of the disparity correction can also depend on the block size (for example, it is transmitted only for blocks larger than or equal to a particular size) or on the employed coding mode (for example, it may only be present for blocks that are not coded in a merge or skip mode).

The derivation of the inter-view residual prediction as described so far necessitates, in accordance with the above outlined variations regarding the derivation of the underlying disparity displacement in accordance with, for example, FIGS. 1c and 1d, that an estimate 64 of the depth map for the current picture is available. As mentioned above, this depth map estimate 64 can specify a sample-wise depth map (a depth value is specified for each sample of the current picture) or a block-wise depth map (a depth value is specified for blocks of samples). The depth map estimate 64 may be derived based on already coded parameters, such as depth maps or disparity vectors and motion parameters. In principle, the possibilities for deriving a depth map estimate 64 for the current picture can be categorized into two classes. For one class, the depth map estimate is derived based on actually coded depth maps. The corresponding possibilities described below involve that the coded depth maps are present in the bitstream (before they are used). Concepts of the second class don't necessitate that depth maps are coded as part of the bitstream. Instead, the depth map estimate is derived based on coded disparity and motion vectors. The second class of procedures can be applied independently of whether depth maps are coded as part of a bitstream. Both cases discussed above with respect to FIGS. 1c and 1d for which the following description in so far provides individually transferable details regarding individual aspects. It should also be noted that, when depth maps are coded, both classes of methods can be applied. It is also possible to select different methods for different frames.

In the following, the basic concept and embodiments for deriving depth maps estimates (with and without coded depth maps) are described.

Class 1: Derivation Based on Coded Depth Maps

If the depth map that is associated with the current picture $32t_2(T)$ would be coded before the current picture, the reconstructed depth map could directly be used as an estimate of the real depth map for the current picture. It is also possible to pre-process the coded depth map (e.g., by applying a filtering it) and use the result of the pre-filtering as the estimate of the depth map that is used for deriving the disparity vector used for residual prediction.

In most configurations, the depth map that is associated with a particular picture is coded after the picture $32t_2(T)$ (often directly after the associated picture). Such a configuration allows that coding parameters (such as motion parameters) that are transmitted for coding the conventional video pictures can be used for predicting the coding parameters that are used for coding the depth maps, which improves the overall coding efficiency. But in such a configuration, the depth map that is associated with a picture cannot be used as an estimate for the depth map in deriving the disparity vector used for residual prediction. However, the depth map for an already coded view (of the same access unit) such as 20 is usually available and can be used for deriving an estimate of the depth map of the current picture. At least, the depth map of the base view (independent view) 20 is available before coding any dependent view 22. Since the depth map of any view represents the geometry of the projected video scene to some extent (in combination with camera parameters such as focal length and the distance between cameras) it can be mapped to another view. Consequently, if the depth map for the current picture $32t_2(T)$ is not available, the coded depth map for an already coded view of the same access unit 20 is mapped to the current view and the result of this mapping is used as depth map estimate.

In the following we describe a particular algorithm for realizing this mapping. As described above, each depth value d corresponds to a displacement vector v between two given views. Given transmitted camera or conversion parameters, a depth value d can be converted to a displacement vector my the mapping $v=f_{vd}(d)$. Hence, given a depth value d at a particular sample location $x_R$ in the reference depth map (already coded), the sample location $x_C$ of the same depth value in the current depth map is obtained by adding the disparity vector to $X_R$, $x_C=x_R+v$. Hence, each depth value of the reference depth map can be mapped to a sample location of the current depth map in order to obtain a depth map estimate 64 for the current picture. However, since parts of objects that are visible in one view are not visible in another view, there are sample locations in the depth map for the current view 22 to which more than one depth values is assigned and there are sample locations in the depth map for the current view to which no depth values are assigned. These sample locations may be processed as follows:

If more than one depth value is assigned to a particular sample location, it means that a foreground object is displaced in front of a background object. Consequently, the depth value d (of the potential depth values) that represents the smallest distance to the camera is assigned to such a sample location.

If more no depth value is assigned to a particular sample location, it means that a foreground object has moved and the previously covered background is visible. The best that can be done for such regions is to assume that the disoccluded background has the same depth than the neighboring background samples. Hence, regions to which no depth value has been assigned are filled with the depth value of the surrounding samples that represents the largest distance to the camera.

This algorithm is specified in more detail in the following. For simplifying the following description, we assumed that larger depth values represent smaller distances to the camera than smaller depth values (but the algorithm can easily be modified for the opposite assumption):

1. All samples of the depth map (estimate) for the current picture are set to an undefined depth value (e.g., −1).
2. For each sample location $x_R$ of the reference depth map, the following applies:
   a. The depth value d at the sample location $x_R$ is converted to a disparity vector 1? using the given camera or conversion parameters, the disparity vector v is rounded to sample accuracy (if applicable), and the sample location inside the current picture is derived by $x_C=x_R+v=x_R+[\text{round}(f]_{vd}(d))$.
   b. If the depth value at sample location $x_C$ in the current picture has an undefined value, the depth value at sample location is set equal to the depth value d.
   c. Otherwise, if the depth value at sample location $x_C$ in the current picture has a defined value $d_x$, with $d_x<d$, the depth value at sample location is modified and set equal to the depth value d.
3. The regions in the current depth map that have undefined depth values are filled by a particular hole filling algorithm. For such a hole filling algorithm, the depth value of the background that is uncovered in the current view is derived based on the samples of the surrounding depth values. As an example, the smallest depth map value of the surrounding samples can be assigned. But more sophisticated hole filling algorithms are possible.

Figure 6:
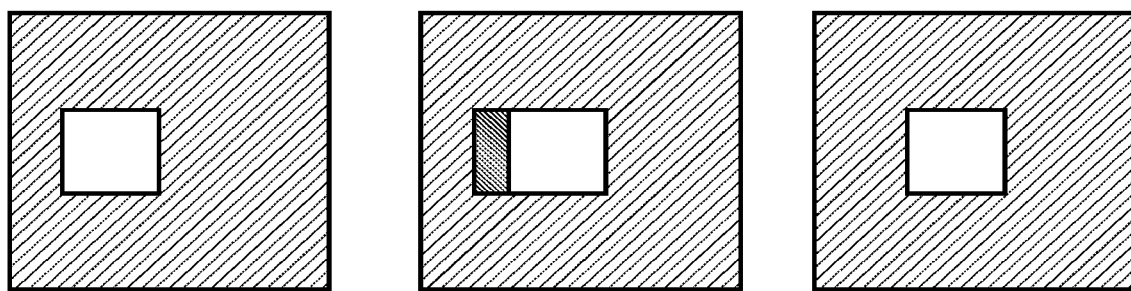
FIG. 6 shows a basic process for mapping a depth map given for one view to another view: (left) given depth map for a view, where the grey area represents a background and white area represents a foreground object; (middle) converted depth map obtained by displacing the samples with the disparity vectors that corresponds to the depth values and keeping the foreground object for locations to which more than one sample is projected, the black area represents on disoccluded area to which no sample has been projected; (right) converted depth map after filling the disoccluded areas by the depth value for the background.

The algorithm for mapping a depth map of a given view to a different view is further illustrated in FIG. 6 on the basis of a very simple example. FIG. 6 illustrates a possible process for mapping a depth map such as $32t_1(T)$ given for one view 20 to another view 22. At the left hand side, the given depth map for the reference view is shown, where the shaded area represents a background and the white area represents a foreground object; in the middle of FIG. 6, middle, the converted depth map obtained by displacing the samples of the given map with the disparity vectors that correspond to the depth values and keeping the foreground object for locations to which more than one sample is projected, is shown. The black area represents on disoccluded area to which no sample has been projected. FIG. 6, right, shows the converted depth map after filling the disoccluded areas by the depth value for the background, i.e. by background filling.

In a particular embodiment of the invention, the hole filling can realized by a particularly simple algorithm which processes the lines of the converted depth map separately. For each line segment that consists of successive undefined depth values, the two surrounding values are considered, and all depth samples of the line segment are replaced with the smaller of these two depth values (background depth). If the line segment has only one surrounding depth value (because it is located at the image border), the depth samples of the line segment are replaced with this value. If complete lines have undefined values after this process, the same process is applied for the columns of the depth map.

Although the algorithm above has been described for sample-wise depth maps, it can also be applied to block-wise depth maps (resulting in a lower complexity) or the given sample-wise depth map for the reference view can first be converted into a block-wise depth maps (by downsampling) and then the algorithm can be applied for the block-wise depth map.

Class 2: Derivation Based on Coded Disparity and Motion Vectors

If no depth maps are coded as part of the bitstream, an estimate for the depth map can be generated by using the coded motion and disparity vectors. A basic idea of the following concept can be summarized as follows. The decoding of a (multi-view) video sequence generally starts with a random access unit. The picture for the base view in a random access unit is intra coded without referencing any other picture. The pictures for dependent views in the random access unit can be intra coded or predicted using disparity-compensated prediction. Typically, most blocks will be coded by disparity-compensated prediction, since it usually gives better prediction results than intra prediction. Since, the coded disparity vectors (which are used for disparity-compensated prediction) can be converted into depth values (using the inverse function $f_{vd}^{-i}$), the disparity vectors can be directly used for generating a block-based depth map that is associated with a dependent view in a random access unit (the depth for intra-coded blocks can be estimated based on the depth for surrounding disparity-compensated block). Then, this obtained depth map can be mapped to the base view. The next picture for the base view is typically coded using mostly motion-compensated prediction. Here, it can be assumed that the motion of the depth data is the same as the motion for the texture information (a depth and an associated texture sample belong to the same object point). Given this assumption, the estimated depth data for the first picture in the base view can be motion-compensated for obtaining an estimate for the depth map of the base view in the current access unit. And then, this (motion-compensated) depth map estimate for the base view can be mapped to a dependent view for obtaining a depth map estimate for the current picture (in the current view). If more than two views are coded, the creation of depth map estimates for the third view, fourth view, etc. can be simplified, since we also have a depth map estimate for the first two views of the access unit. One of these depth map estimates (advantageously the base view) can be mapped to the third, fourth, or any following view in order to generate a depth map estimate for this view.

Figure 7:
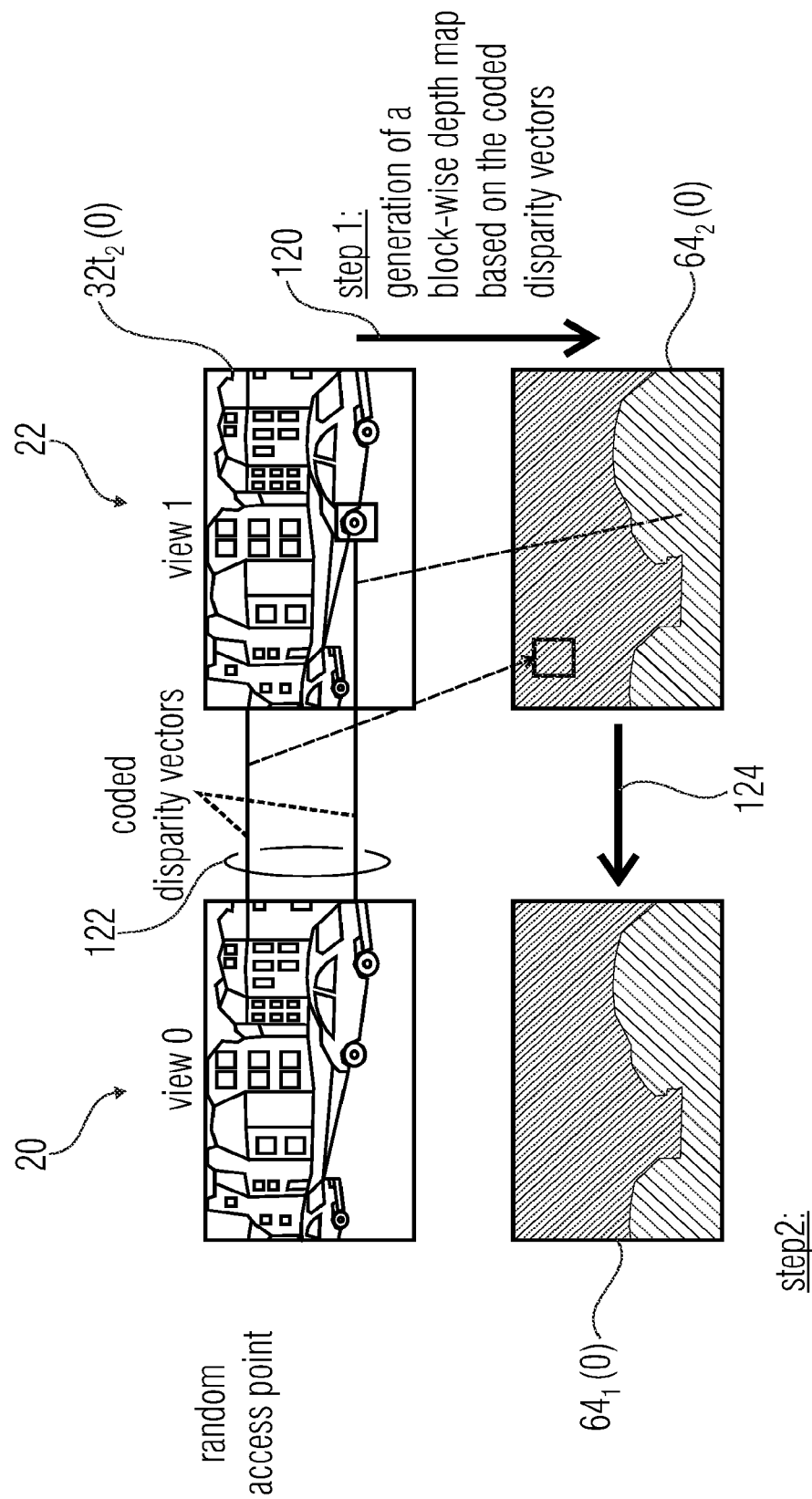
FIG. 7 shows a generation of depth maps (using disparity vectors) for a random access unit.

The idea of generating a depth map estimate is further illustrated by some figures (showing the processing steps for multi-view coding with two views as they are performed by depth estimator 28). The coding/decoding starts with a random access unit, for which the base view picture $32t_1(0)$ is intra-coded and the non-base-view pictures $32t_2(0)$ are coded using only intra and inter-view prediction (but no motion-compensated prediction). After coding the second view 22 in the random access unit "0", a block-based depth map estimate for this second view 22 is generated 120 using the coded disparity vectors 122 for this view 22, as illustrated in FIG. 7. This depth map estimate $64_2(0)$ for the second view 22 is then mapped 124 to the first view (base view) 20 and a depth map estimate $64_1(0)$ for the first view 20 is obtained. It should be noted that for the second view 22 of a random access unit, no estimate of the depth map is available when the second view 22 of a random access unit is coded.

If a third view is coded, the depth map estimate of any of the first two views (advantageously the second view) can be mapped to the third view resulting in a depth map estimate for the third view, which can be used for deriving disparity vectors for the third view. And after coding the third view, a block-based depth map can be generated using the coded disparity vectors for the third view (which can than later be used for generating a depth map estimate for any following view). For any following view, basically the same process as for the third view can be used.

Figure 8:
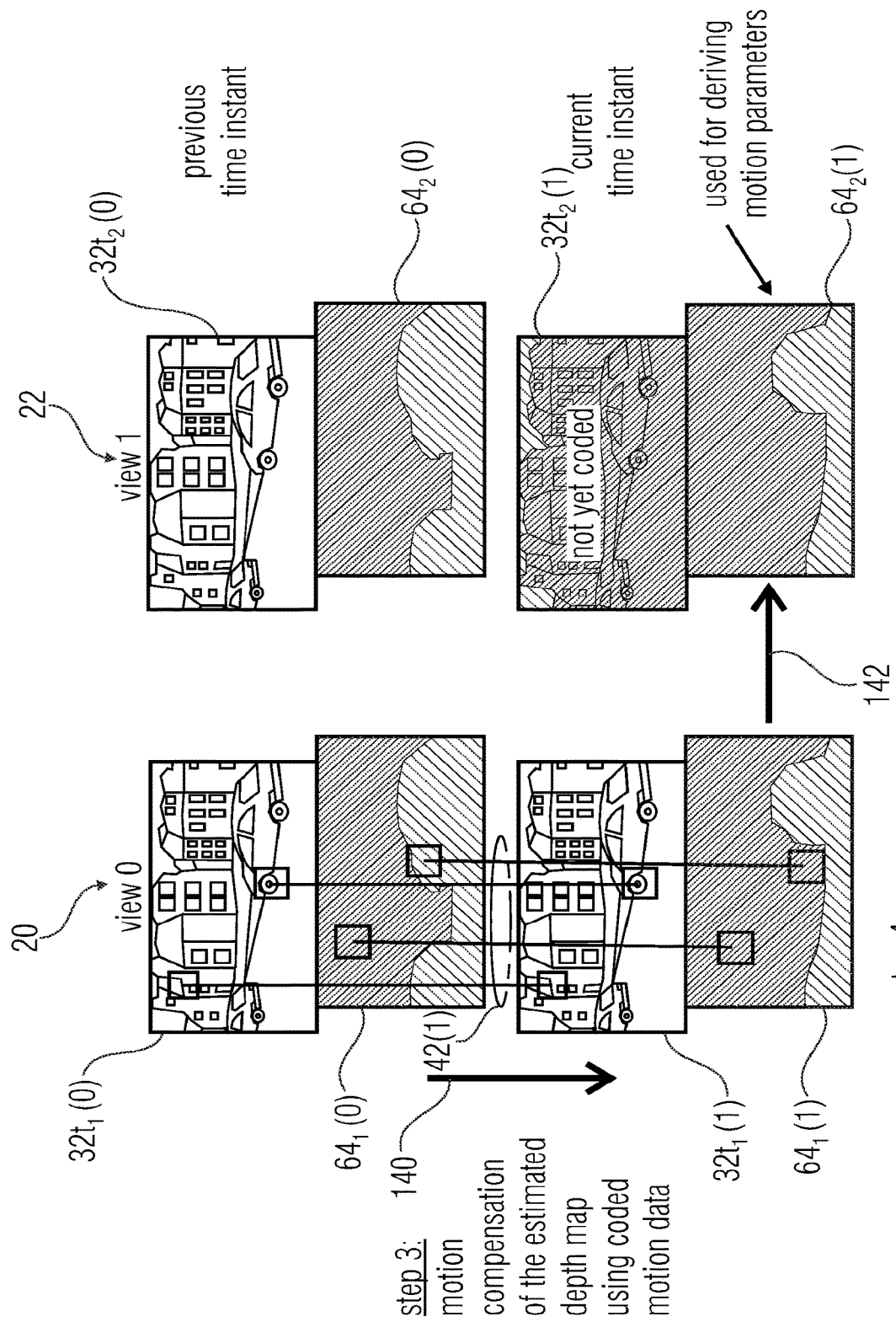
FIG. 8 shows temporal prediction of an estimated depth map using the motion parameters coded in the base view.

The pictures of the base view in non-random-access units are typically mainly coded by motion-compensated prediction, since motion-compensated prediction usually gives better coding efficiency than intra coding. After a picture of the base view is coded, an estimate of the depth map for this picture is generated 140 (cp. 71 in FIG. 1) using the motion parameters 42(1) for the picture 32$t_1$(1), as illustrated in FIG. 8. Therefore, each block of the new depth map estimate 64$_1$(1) is created 140 by motion-compensating the depth map estimate 64$_1$(0) (cp. 74 in FIG. 1) for the corresponding reference picture or pictures. The reference pictures and corresponding motion vectors 42(1) that are used are the reference pictures and motion vectors that are coded in the data stream for the associated picture. The depth samples for intra-coded blocks can be obtained by spatial prediction. This depth map estimate for the base view is than mapped 142 (cp. 76 in FIG. 1) into the coordinate system for the second view in order to obtain a depth map estimate 64$_2$(1) for the second view which can be used for deriving disparity vectors, i.e. to perform inter-view redundancy reduction.

For any further coded view, a depth map estimate can be generated by mapping the depth map estimate for any already coded view (base view, second view, etc.) to the corresponding view.

Figure 9:
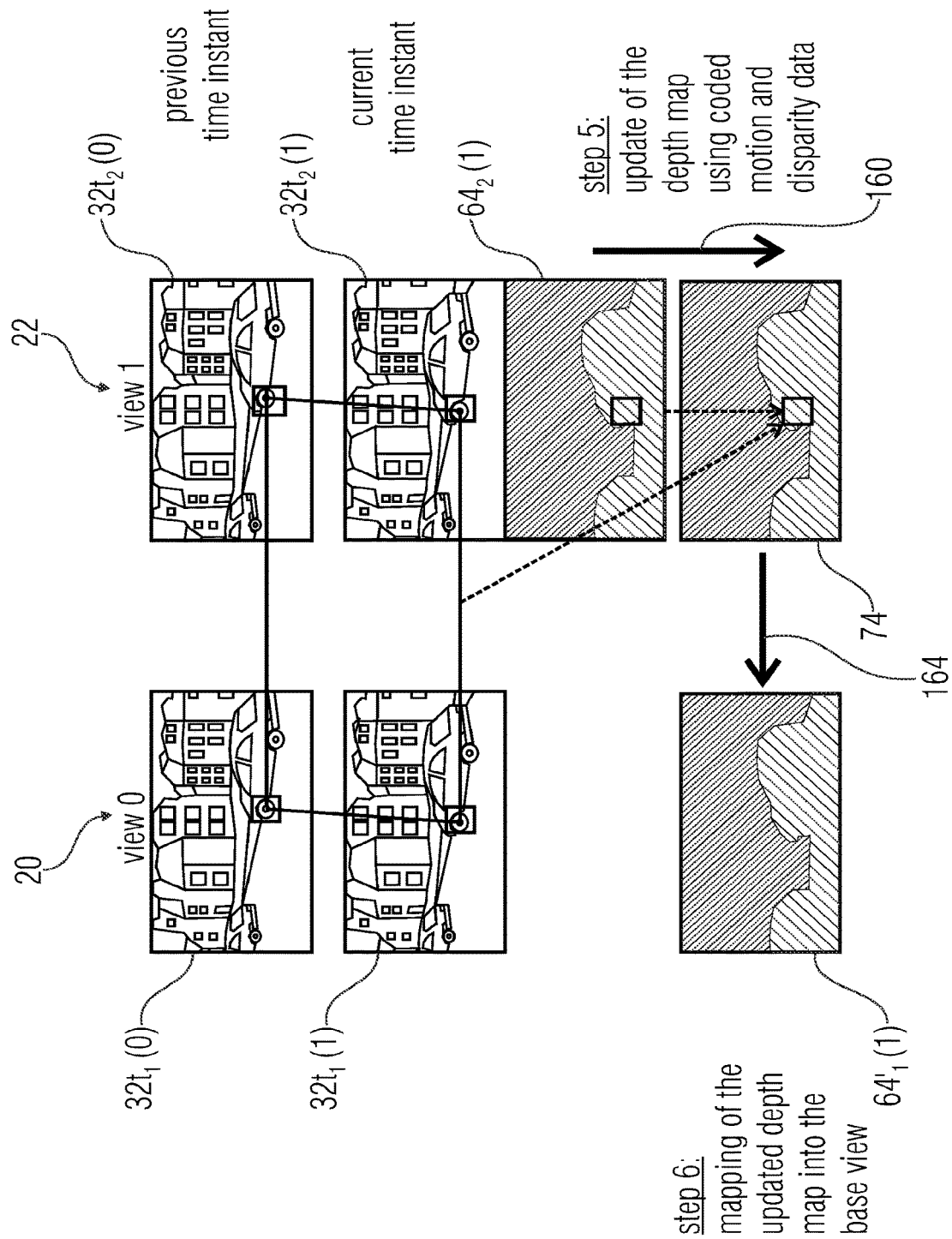
FIG. 9 shows an update of the depth map using actually coded motion and disparity vectors.

After actually coding the picture of the second view (or any following view), the associated depth map estimate can be updated 160 (cp. 77 in FIG. 1) using the actually coded motion and disparity vectors, as illustrated in FIG. 9. For blocks that are coded using disparity compensation (or for which disparity vectors or disparity correction vectors are transmitted), the depth map samples can be obtained by converting 162 the coded disparity vectors 60 to depth values as described above. For blocks that are coded using a motion-compensated mode, the depth samples can be obtained by motion compensating the depth map estimate for the reference frame 32$t_2$(0). Or alternatively, a depth correction value, which is added to the current depth map estimate 64$_2$(1), can be derived based on the coded motion parameters 42(1) and 54(1) for the current and for the reference view. The depth samples of intra coded blocks can be predicted using spatial prediction or using the motion parameters of neighboring blocks. After an updated depth map estimate 74 for the second view has been generated, this depth map estimate 74 is mapped 164 (cp. 78 in FIG. 1) to the base view 20 for obtaining a depth map update 64' i(1) (cp. 74 in FIG. 1) for the base view 20.

If more than two views are coded, the depth map update process for these views is the same as for the second view. However, the base view depth map is only updated after the second view has been coded.

The motion compensation operations for depth maps can be performed using the coded sub-sample accurate motion vectors. It is, however, often advantageous (from a complexity as well as coding efficiency point of view), if the motion compensation operations for depth maps are performed with sample (or even block) accuracy. Therefore, the actually coded motion vectors are rounded to sample or block accuracy and these rounded vectors are used for performing the motion compensation. Furthermore, the described concept can be applied for sample-wise as well as block-wise depth map estimates. The advantage of using block-based depth maps is a lower complexity and memory requirement for all processing steps. With block-based depth maps, each depth sample represents the depth for a block of samples of the associated picture (e.g., 4×4 blocks or 8×8 blocks). All described operations can be performed for block-based depth maps in a straightforward way (i.e., by simply considering a lower resolution of the depth maps—one depth sample just represents multiple instead of one texture sample).

Besides the mapping of a given depth map from one view to another (which has been described above), the algorithm contains the following basic steps:

Creating a depth map based on disparity vectors for a picture of a random access unit.

Temporal prediction of the base view depth map using the motion parameters of the associated picture.

Update of a depth map estimate using actually coded motion and disparity vectors for the associated picture.

Particular embodiments for these algorithmic steps are described in the following.

Creation of a Depth Map for a Picture in a Random Access Unit

In a particular embodiment of the invention, the creation of a depth map for a picture of a dependent view in a random access unit proceeds as follows. In general, such a picture contains blocks that are coded using disparity-compensated prediction as well as blocks that are intra coded. First, all blocks that are coded using disparity-compensated prediction are considered. The disparity vectors are converted into depth values and these depth values are assigned to the corresponding samples of the depth map. If two or more motion hypotheses are used, either one hypothesis is selected or the final depth value is set equal to a function of the depth values for the individual motion hypotheses (for example, the average, the median, the maximum, or the minimum). After assigning the depth values for all disparity-compensated blocks, the depth values for intra coded blocks are obtained by spatial intra prediction. In one version, these samples can be obtained by using the same intra prediction modes that are used for the associated texture picture. In another version, the depth of an intra-block can be set equal to a depth values that is obtained by a weighted average of the surrounding samples (or blocks), where the weighting factors can be determined based on the used intra prediction modes. In a further version, the depth for an intra-block can be obtained by setting the depth samples equal to a value that is given by a particular function of the surrounding intra samples (e.g., the average, the median, the maximum, the minimum). Other spatial prediction algorithms are also possible. The depth assignment for intra-coded blocks can also be done inside a single loop over the blocks in an image. That means, the blocks are processed in a particular order (e.g., the coding order), and for both disparity-compensated and intra blocks, the depth values are generated in this order (i.e., the depth assignment for intra-coded blocks doesn't need to wait until all disparity-compensated blocks are processed).

Temporal Prediction of the Base View Depth Map

In general, pictures of the base view contain motion-compensated blocks and intra coded blocks. The depth values for motion-compensated blocks are derived by motion-compensated prediction of the depth map estimate for the corresponding reference picture. If a block of the texture picture is coded using a single motion hypothesis, the depth samples for this block can be obtained by displacing the depth samples of the depth map estimate for the reference picture (given by the signaled reference index) by the transmitted (or inferred) motion vector. This motion compensation operation can be performed with the accuracy of the transmitted motion vectors (which is usually a sub-sample accuracy) or with sample- or block-accurate motion vectors. If the motion compensation is performed with sub-sample accuracy, an interpolation filter is applied for generating the samples at sub-sample positions. If the motion compensation is performed with sample or block accuracy, the transmitted motion vectors are rounded before they are used. If the block of the associated picture is coded with more than two motion hypothesis, one of the hypotheses can be selected for motion compensation of the depth maps, or all motion hypotheses are used by generating the final depth map estimate for the block as a weighted sum of the depth prediction signals for the individual motion hypotheses. Furthermore, the depth samples for a block of a given sizes can be set equal to a representing depth. This representing depth can be obtained by selecting a particular location inside the block and deriving the depth value for this location using motion compensation, or it can be obtained by defining a function of the motion-compensated depth values for this block. Such a function can be the average of the depth samples, or the median of the depth samples, or the minimum or maximum of the depth samples, or the depth sample value that occurs most often in the block.

Update of a Depth Map Using the Coded Motion and Disparity Parameters

As mentioned above, the depth map estimate for a picture can be updated after coding the picture. In the following, we describe some embodiments of such an update algorithm. Blocks of the picture are processed in a particular order (for example, the coding order) and for each block, the following applies:

If the block has been intra-coded (in the associated texture picture), the depth sample values for this block can be derived by spatial prediction using the samples of neighboring block. Some examples for such a spatial prediction technique have been described above. The depth sample values can also be obtained by motion compensation using the motion parameters of a neighboring block (see the description for motion-compensated blocks below). It is sometime advantageous, if the intra block are processed after all motion- and disparity-compensated blocks are processed, because then more neighboring are available and can be used for spatial prediction of depth samples or motion parameters.

Otherwise, if the block is coded using one or more disparity vectors (disparity hypotheses), the depth samples are derived by converting the disparity vectors to depth values. If only one disparity vector (disparity hypothesis) is used for the block, the depth value if given by the corresponding disparity vector. If two or more disparity vectors are used for the block, one of the disparity vectors can be selected for deriving the depth value, or for each disparity vector a depth value can be derived and the finally assigned depth value is obtained by applying a function of the individually derived depth values. Possible functions are, among others, the minimum or maximum of the individual depth values, the median of the depth values, the average of the depth values, or the depth values that occurs most often.

Note that a block that is coded using a disparity vector may additionally be associated with a temporal motion vector. In this case, the temporal motion vector can be ignored. Or the derived depth values can be combined with depth values that are derived for temporal motion hypotheses (see below) in any specific way (e.g., by averaging these two signals).

The disparity vector based depth estimation can also be used if a disparity vector or a disparity vector correction has been coded for updating/refining the derived disparity vector used for residual prediction.

Otherwise, the block is coded using only temporal motion hypotheses and the temporal motion hypotheses are used for updating the depth samples for the block.

In a first embodiment of the invention, the depth map samples are derived by straightforward motion compensated prediction using the depth map estimates associated with the reference pictures for the current view. This motion compensation operation can be realized by any of the embodiments for temporal prediction of the base view depth map described above.

In a second embodiment of the invention, the depth map samples are not simply motion compensated, but instead a depth correction value is derived based on the motion vector coded for the current view and the motion vector coded for the corresponding block in the reference view and this depth correction value is added to the depth map estimated in order to obtain an updated depth map estimate. The advantage of such an approach is that depth changes between two instances can be considered.

Let $d_{prd}$ be the current depth estimate for a sample or a block, let $m_{curr}$ be the motion vector that is actually used for motion-compensation of the current block, and $m_{re}$ be the motion vector for the reference block in the reference view (the reference block is derived by using a disparity vector given by the depth estimate $d_{prd}$ as described above). Furthermore, let '$v_{t-1}$ be the disparity vector in the reference access unit and let $v_t$ be the disparity vector in the current access unit. Given the basic equation for the interrelationship between the motion and disparity vectors that we derived in the beginning of the description (see illustration in FIG. 10 for s single sample), $$m_{curr}+v_{t-1}-m_{ref}-v_t=0,$$

the current disparity vector can be set equal to $$v_t=v_{t-1}+(m_{curr}-m_{ref}),$$

if we assume that the coded motion parameters and the disparity in the reference picture are correct. The disparity vector can be converted into a depth and vice versa. Hence, the current depth can be expressed as $$d=d_{t-1}+f_{vd}^{-1}(m_{curr}-m_{ref}),$$

The depth $d_{t-1}$ is the depth value given in the reference image, it can be accessed using the motion vector for the current block. It is also possible to replace the depth in the reference image with the current estimate for the depth $d_{prd}$, since this depth has been derived using motion compensation from the depth in a reference image.

We showed the basic concept for obtaining an updated depth value using the motion vectors of the current and the reference block. This basic concept can be used in a variety of actual implementations. For example, if more than one motion vector is used for the current block and/or the reference block, a single motion vector can be selected or different depth values can be derived for the different motion vector and the final depth is obtained by using the average (or any other function) of the individually derived depth values. Furthermore, only those motion hypotheses in the current and the reference block should be considered that use the same reference access unit (or reference time instant, or reference picture order count, or reference index). If such motion hypotheses don't exist, the conventional motion compensation process described above can be used or the depth sample can be marked as not available and are later replaced by suitable post-processing steps. Furthermore, the new depth value can be derived based on a single sample for a block, or for all samples of a block, or for a selected subset of the samples of a block. When different depth values for different samples are derived, separate depth values can be assigned for different regions of the current block (e.g., for all 4×4 blocks inside the current block), or the different depth values are used for deriving a representing depth for the entire block, e.g., by using the average, the median, the minimum, the maximum value, or the depth values that occurs most often. The depth map update process can also be combined with some pre-processing steps. For example, not available depth values can be replaced by the depth values of neighboring samples or blocks.

The above embodiments thus enable reducing the bit rate associated with coding residuals in multiview video coding applications by employing the residual data coded in one view for an efficient coding of the residuals for other views. These embodiments are applicable to multiview video coding with two or more views and for multiview video coding with and without depth maps. According to these embodiments it is possible to re-use the coded residual in one view for efficiently coding the residual in another view. Since all views represent the same video scene, the changes of sample values from one frame to another are similar for different views and this effect can be exploited for an efficient coding of dependent view. The above embodiments describe a concept for efficiently employing the residual of already coded views for following views, by using estimated or coded depth data. In accordance with some embodiments, the motion data that are coded in one view, is additionally used for predicting the motion data of other views.

Favorably, the above embodiments enable to use the concepts of inter-view motion and residual prediction independently of each other. In rate-distortion sense, the coding efficiency can be usually improved when different tools can be independently selected. For blocks for which the derivation of motion parameters from a reference view works well, an additional residual prediction may decrease the coding efficiency (i.e., it may increase a cost measure D+λ·R, or in other words increases the distortion for a given rate, or increases the rate for a given distortion). Or for blocks for which the residual prediction from a reference view improves the coding efficiency, an additional derivation of motion parameters based on the reference view may decrease the coding efficiency.

Moreover, the above embodiments enable to use subsample accurate vectors. Same can potentially increase the coding efficiency (when it is combined with a better model for the disparity in a picture). Finally, the above embodiments are combinable with the usage of blocks of different block size. Recent investigations (see the development of HEVC) have shown that the provision of multiple block sizes can significantly increase the coding efficiency, and that's why it could be advantageous to provide residual prediction for different block sizes. In particular, the new video coding standardization project of the ITU-T and ISO/IEC JTC 1/WG 11, which is also referred to as HEVC, shows very promising improvements in conventional 2-d video coding technology. The current working draft of HEVC provides substantial coding gains compared to ITU-T Rec. H.264 I ISO/IEC 14496-10. For achieving these gains several concepts have been extended in comparison to ITU-T Rec. H.264 I ISO/IEC 14496-10, and the above described approach for using the residual data of a different view for predicting the residual of the current view cannot be straightforwardly applied to the HEVC design. On the other hand, these techniques have to compete with the improved residual coding in HEVC. The main improvements in the area of residual coding include:

While the blocks sizes that are used for motion-compensated prediction in ITU-T Rec. H.264 I ISO/IEC 14496-10 range from 4×4 to 16×16 luma samples, a much larger variety of blocks sizes is supported in HEVC, which ranges from 4×4 to 64×64 luma samples. In addition, the basic coding units are not given by fixed macroblock and sub-macroblocks, but are adaptively chosen. The largest coding unit is typically a block of 64×64 luma samples, but the largest block size can actually be signaled inside the bitstream. The splitting of a block into subblock can establish a subdivision hierarchy of 4 or more levels. Furthermore, a block that is used for prediction can be further split into multiple transform blocks for the purpose of residual coding. Here, a hierarchy of multiple levels is supported.

Different transform sizes ranging from 4×4 to 16×16 transforms are supported.

The entropy coding of transform coefficients has been improved.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein. The data carrier, the digital storage medium or the recorded medium are typically tangible and/or non-transitionary.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are performed by any hardware apparatus.

While this invention has been described in terms of several advantageous embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

[1] ITU-T and ISO/IEC JTC 1, "Advanced video coding for generic audiovisual services," ITU-T Recommendation H.264 and ISO/IEC 14496-10 (MPEG-4 AVC), 2010.
[2] A. Vetro, T. Wiegand, G. J. Sullivan, "Overview of the Stereo and Multiview Video Coding Extension of the H.264/MPEG-4 AVC Standard", *Proceedings of IEEE*, vol. 99, no. 4, pp. 626-642, April 2011.
[3] H. Schwarz, D. Marpe. T. Wiegand, "Overview of the Scalable Video Coding Extension of the H.264/AVC Standard", *IEEE Transactions on Circuits and Systems for Video Technology*, vol. 17, no. 9, pp. 1103-1120, September 2007.

What is claimed:

1. A method for reconstructing a multi-view signal coded in a data stream, comprising:
    obtaining a disparity vector representing a view displacement between a current view and a reference view of a multi-view signal;
    identifying a reference-view coding block in a picture of the reference view based on the disparity vector;
    obtaining reference motion information associated with the reference-view coding block;
    determining current motion information associated with a current coding block in a picture of the current view based on the reference motion information; and
    reconstructing the current coding block based on the current motion information and a current-view residual signal associated with the current coding block, wherein the current-view residual signal is based on a reference-view residual signal associated with the reference-view coding block.

2. The method of claim 1, further comprising obtaining the current-view residual signal based on the disparity vector.

3. The method of claim 2, wherein obtaining the current-view residual signal is based on the disparity vector and the reference-view residual signal associated with the reference-view coding block.

4. The method of claim 3, wherein the reference-view residual signal and the current-view residual signal are represented in a transform domain.

5. The method of claim 1, further comprising:
    extracting, from the data stream, a disparity vector residual signal;
    refining the disparity vector based on the disparity vector residual signal to generate a refined disparity vector; and
    identifying the reference-view coding block based on the refined disparity vector.

6. The method of claim 1, wherein the obtaining of the disparity vector includes estimating the disparity vector based on temporal prediction using information related to a block in a previously reconstructed picture of the current view.

7. A method for encoding a multi-view signal into a data stream, comprising:
    obtaining a disparity vector representing a view displacement between a current view and a reference view of a multi-view signal;
    identifying a reference-view coding block in a picture of the reference view based on the disparity vector;
    determining reference motion information associated with the reference-view coding block based on block-based predictive coding;
    determining current motion information associated with a current coding block in a picture of the current view based on the reference motion information; and
    inserting into the data stream the disparity vector and the reference motion information, wherein a current-view residual signal associated with the current coding block is based on a reference-view residual signal associated with the reference-view coding block.

8. The method of claim 7, further comprising determining a reference-view residual signal associated with the reference-view coding block based on the block-based predictive coding; and inserting into the data stream the reference-view residual signal.

9. The method of claim 7, wherein the current-view residual signal is determined based on the reference-view residual signal and the disparity vector.

10. The method of claim 7, wherein the reference-view residual signal and the current-view residual signal are represented in a transform domain.

11. The method of claim 7, wherein the obtaining of the disparity vector includes estimating the disparity vector based on temporal prediction using information related to a block in a previously reconstructed picture of the current view.

* * * * *